United States Patent [19]
Carino et al.

[11] Patent Number: 5,886,295
[45] Date of Patent: Mar. 23, 1999

[54] MODULAR UTILITY DISTRIBUTION MOUNTING SYSTEM

[75] Inventors: Phillip D. Carino, Grand Rapids; Steven C. Deer, Caledonia; Paul A. DenHartigh, Zeeland, all of Mich.; Peter Ehling, Chicago, Ill.; Michael J. Everhart, Lowell, Mich.; Gareth H. Hendricks, Grandville, Mich.; Alan F. Mauer, Lowell, Mich.; Kevin M. Stanley, Battle Creek, Mich.; David A. Walz, Grand Rapids, Mich.

[73] Assignee: Steelcase Inc., Grand Rapids, Mich.

[21] Appl. No.: 896,434

[22] Filed: Jul. 18, 1997

[51] Int. Cl.$^6$ ........................................ H02G 3/28
[52] U.S. Cl. .............................. 174/48; 52/220.7; 52/239
[58] Field of Search ................... 174/48, 50; 220/3.2, 220/3.3, 3.9; 52/220.7, 239

[56] References Cited

U.S. PATENT DOCUMENTS

| | | | |
|---|---|---|---|
| 2,032,636 | 3/1936 | Seckinger | 247/21 |
| 2,478,498 | 8/1949 | Myers | 248/117.4 |
| 3,163,882 | 1/1965 | Falkenberg | 16/2 |
| 3,297,886 | 1/1967 | Danner | 307/112 |
| 3,350,501 | 10/1967 | Juriet | 174/135 |
| 3,474,994 | 10/1969 | Swanquist | 248/205 |
| 3,491,974 | 1/1970 | Swanquist | 248/223 |
| 3,524,477 | 8/1970 | Steger, Jr. | 138/106 |
| 3,684,230 | 8/1972 | Swanquist | 248/229 |
| 3,762,398 | 10/1973 | Schefke et al. | 128/2 R |
| 3,989,886 | 11/1976 | Taylor | 174/135 |
| 4,056,297 | 11/1977 | Gartung | 174/48 X |
| 4,094,561 | 6/1978 | Wolff et al. | 312/223 |
| 4,308,418 | 12/1981 | Van Kuik et al. | 174/48 |
| 4,338,485 | 7/1982 | Fullenkamp et al. | 174/48 |
| 4,372,629 | 2/1983 | Propst et al. | 312/223 |
| 4,398,647 | 8/1983 | Ackerman | 220/3.9 |
| 4,406,101 | 9/1983 | Heidmann | 52/220 |
| 4,535,703 | 8/1985 | Henriott et al. | 108/50 |
| 4,612,603 | 9/1986 | Cook | 361/419 |
| 4,634,212 | 1/1987 | Boundy et al. | 174/48 X |
| 4,654,756 | 3/1987 | Wilson et al. | 361/428 |
| 4,662,594 | 5/1987 | Dubis | 248/238 |
| 4,723,746 | 2/1988 | Gould et al. | 248/205.1 |
| 4,747,506 | 5/1988 | Stuchlik, III | 220/3.9 |
| 4,757,908 | 7/1988 | Medlin, Sr. | 220/3.9 |
| 4,792,881 | 12/1988 | Wilson et al. | 361/428 |
| 4,836,127 | 6/1989 | Wille | 114/343 |
| 4,882,885 | 11/1989 | Chatterson et al. | 174/48 X |
| 4,884,513 | 12/1989 | Newhouse et al. | 108/50 |
| 4,899,018 | 2/1990 | Sireci | 174/48 |
| 4,918,886 | 4/1990 | Benoit et al. | 174/48 X |
| 4,993,576 | 2/1991 | Byrne | 220/3.9 |
| 5,024,614 | 6/1991 | Dola et al. | 439/114 |
| 5,025,603 | 6/1991 | Johnson | 52/239 X |
| 5,048,783 | 9/1991 | Grimes | 248/231.2 |
| 5,057,039 | 10/1991 | Persing et al. | 439/574 |
| 5,083,512 | 1/1992 | Newhouse et al. | 108/50 |
| 5,086,194 | 2/1992 | Bruinsma | 174/48 |

(List continued on next page.)

*Primary Examiner*—Dean A. Reichard
*Attorney, Agent, or Firm*—Price, Heneveld, Cooper, DeWitt & Litton

[57] ABSTRACT

A modular mounting system for the delivery of office utilities from a utility distribution system of an office partitioning system to a worksurface positioned in an individual workspace includes a mounting rail having an upper portion shaped for abutting attachment to a bottom surface of the worksurface and further includes a lower mounting portion defining at least one mounting aperture therein. A utility distribution bracket is abutted to the lower mounting portion wherein the bracket includes a base and an upper frame connected to the base defining therein a cavity shaped to closely receive a utility distribution block. The base and frame further define at least one aperture for user access to the utility distribution block. The utility distribution bracket further includes an engagement member extending through the mounting aperture and closely engaging the lower mounting portion of the mounting rail in a fastenerless fashion wherein the utility distribution bracket is disengagable from the mounting rail and interchangeable with others of like utility distribution brackets.

46 Claims, 17 Drawing Sheets

U.S. PATENT DOCUMENTS

| | | | |
|---|---|---|---|
| 5,103,741 | 4/1992 | Grund et al. | 108/50 |
| 5,144,896 | 9/1992 | Fortsch | 108/50 |
| 5,149,277 | 9/1992 | LeMaster | 439/207 |
| 5,160,188 | 11/1992 | Rorke et al. | 312/196 |
| 5,162,614 | 11/1992 | Bogiel et al. | 174/97 |
| 5,188,318 | 2/1993 | Newcomer et al. | 248/68.1 |
| 5,209,562 | 5/1993 | Glassford | 362/378 |
| 5,226,705 | 7/1993 | Rorke et al. | 312/196 |
| 5,231,562 | 7/1993 | Pierce et al. | 361/428 |
| 5,237,935 | 8/1993 | Newhouse et al. | 108/50 |
| 5,272,988 | 12/1993 | Kelley et al. | 108/50 |
| 5,303,123 | 4/1994 | Chandler et al. | 361/785 |
| 5,306,165 | 4/1994 | Nadeau | 439/115 |
| 5,326,934 | 7/1994 | LeMaster et al. | 174/59 |
| 5,340,326 | 8/1994 | LeMaster | 439/207 |
| 5,357,055 | 10/1994 | Sireci | 174/48 |
| 5,362,922 | 11/1994 | Whitehead | 174/48 |
| 5,394,658 | 3/1995 | Schreiner et al. | 52/36.1 |
| 5,408,045 | 4/1995 | Jorgensen et al. | 174/58 |
| 5,418,328 | 5/1995 | Nadeau | 174/48 |
| 5,451,101 | 9/1995 | Ellison et al. | 312/223.6 |
| 5,472,157 | 12/1995 | Lehrman | 248/51 |
| 5,491,300 | 2/1996 | Huppenthal et al. | 174/151 |
| 5,595,494 | 1/1997 | Wiebe | 439/211 |

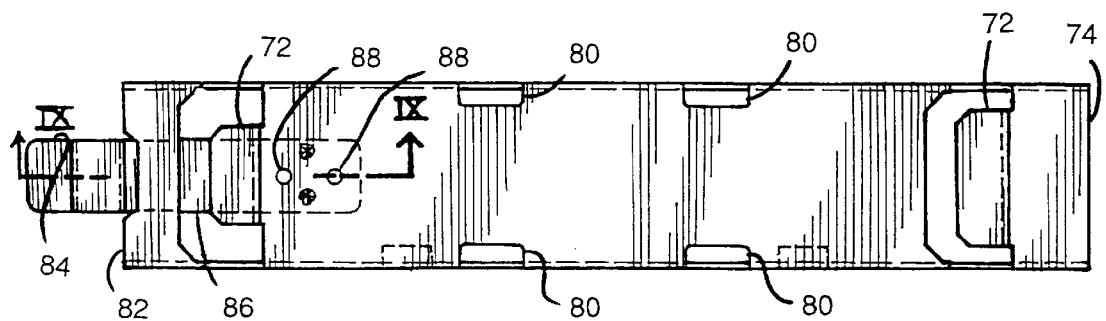
Fig. 8
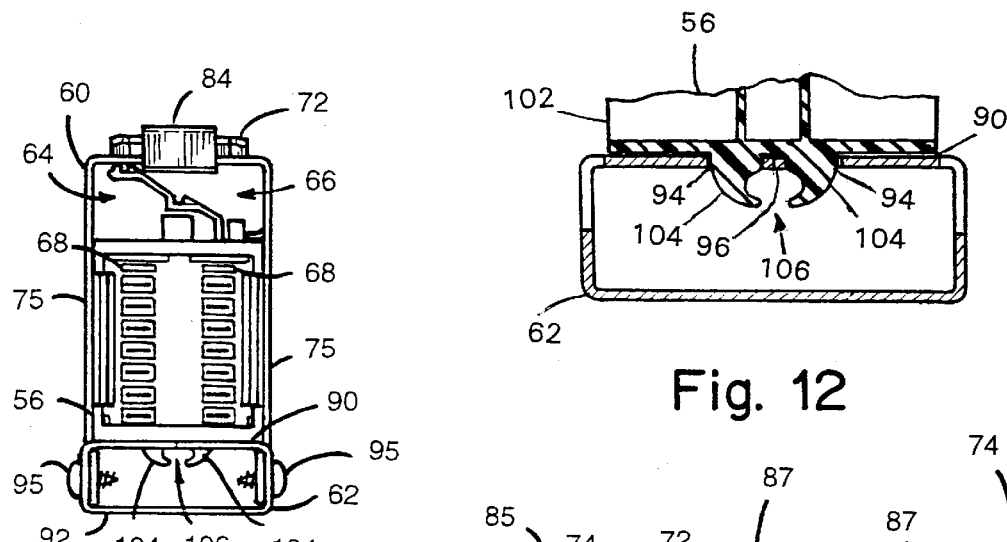
Fig. 11
Fig. 12
Fig. 9
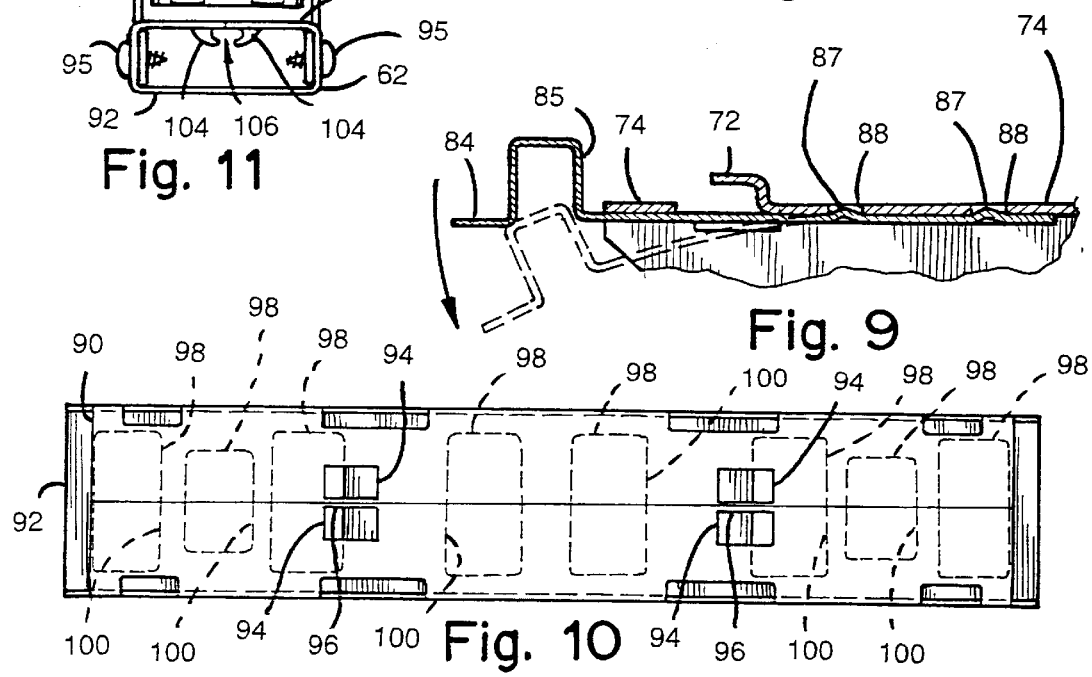
Fig. 10

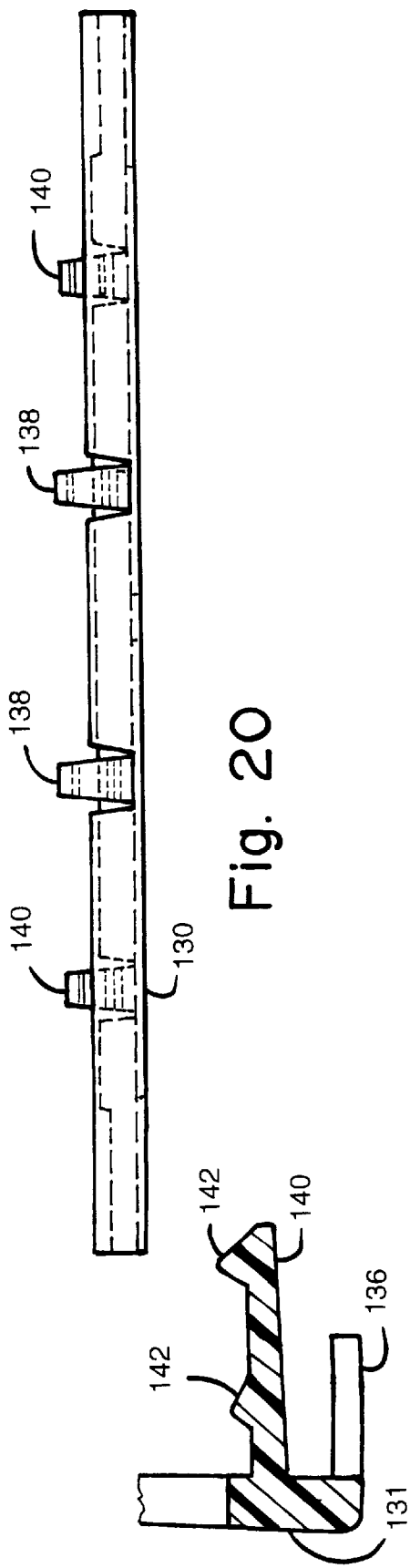
Fig. 20
Fig. 22
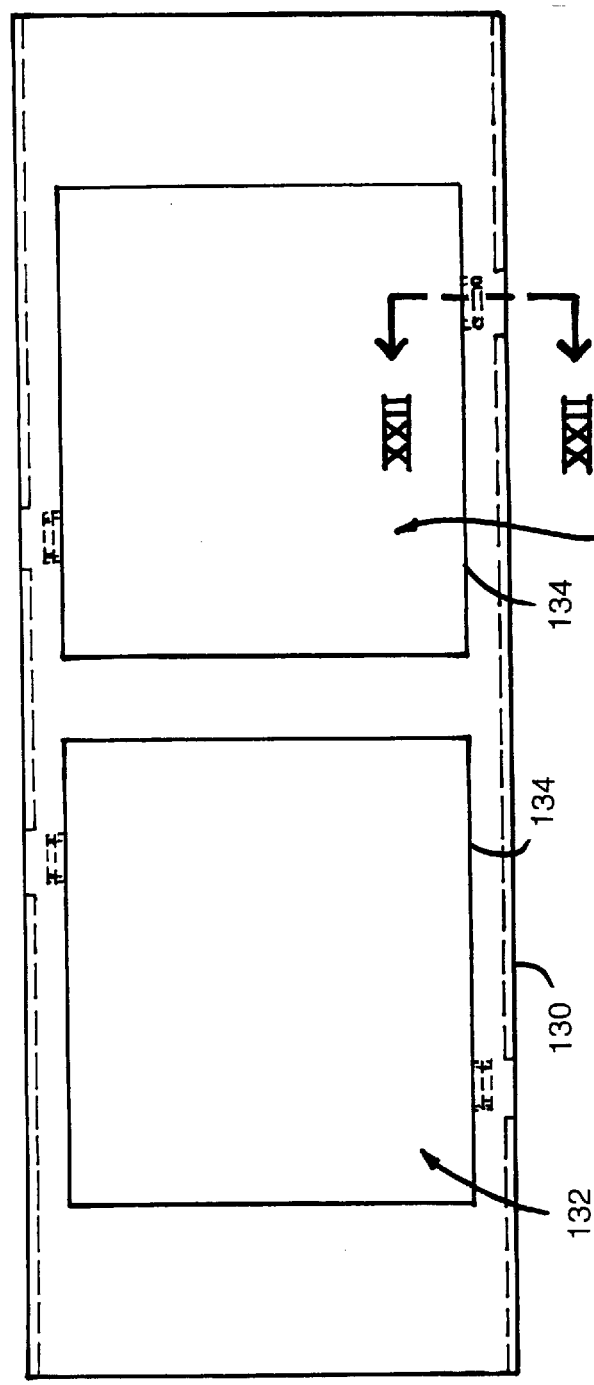
Fig. 21

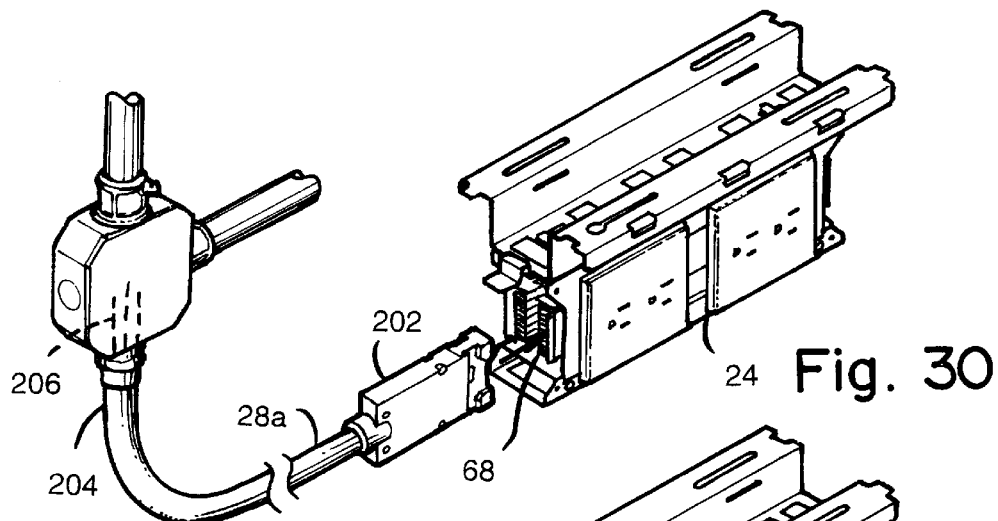
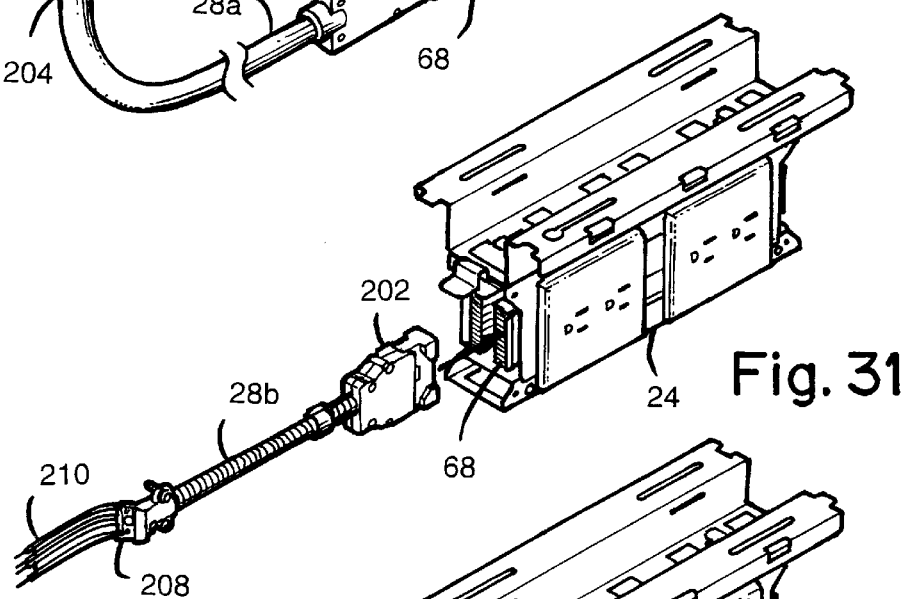
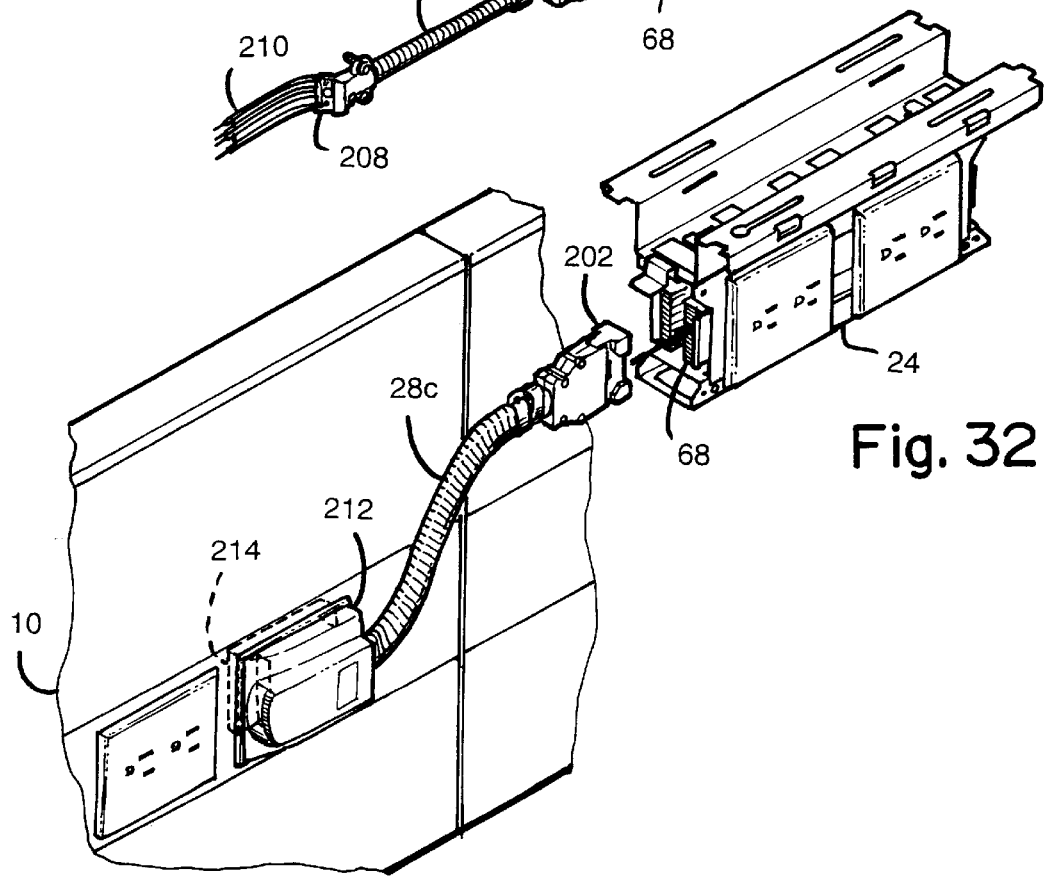

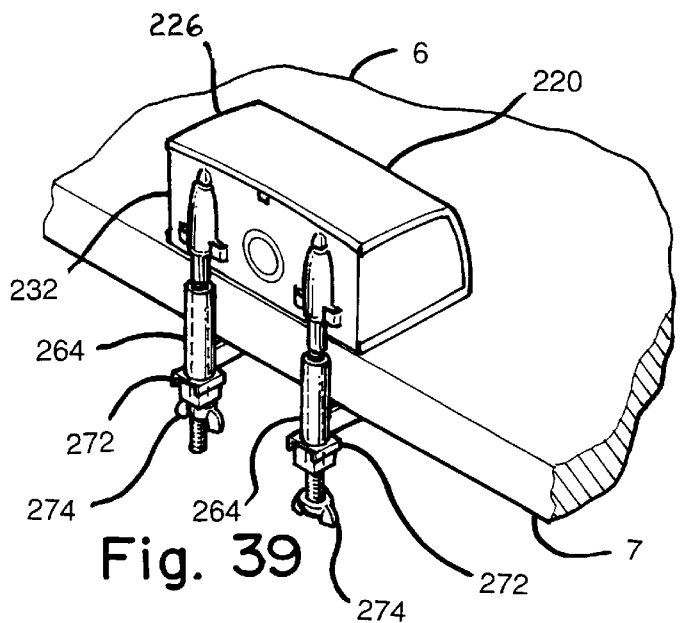
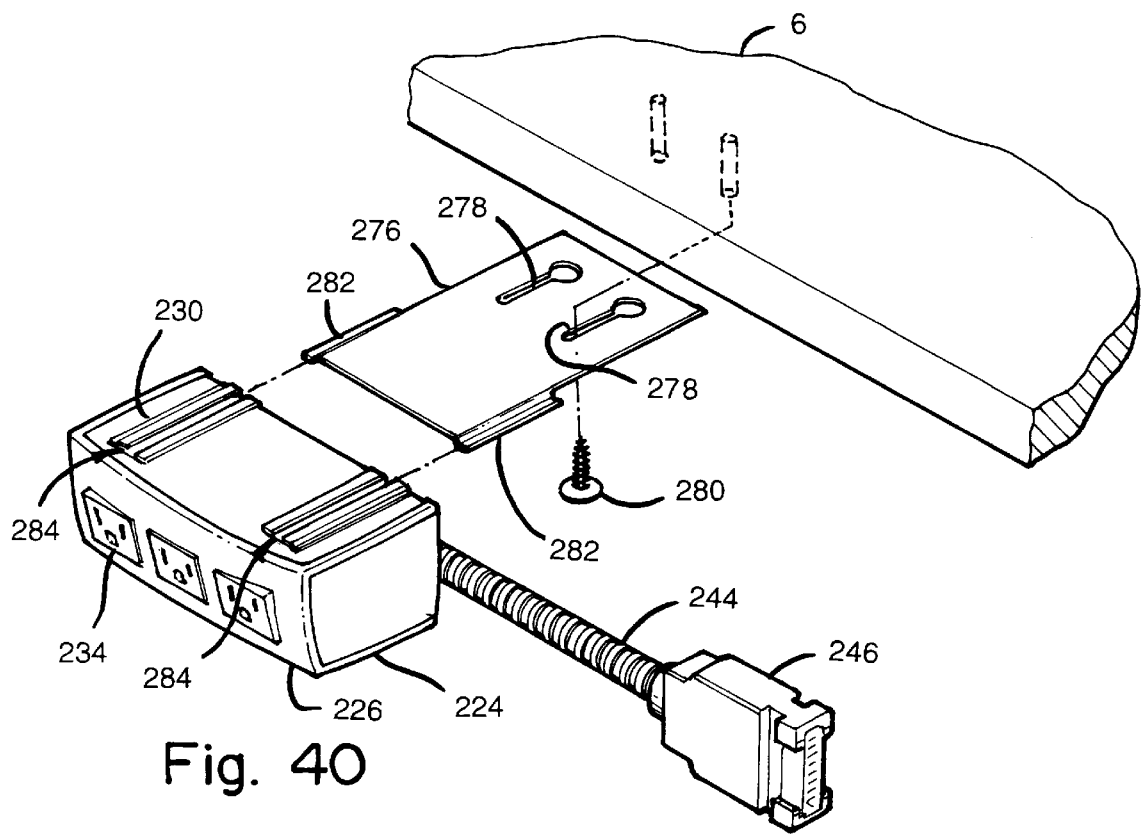

MODULAR UTILITY DISTRIBUTION MOUNTING SYSTEM

BACKGROUND OF THE INVENTION

The present invention relates to utility distribution systems, and in particular to a modular mounting system for the distribution of utilities at individual workstations.

Portable partition systems for open office spaces, and other similar settings, are well-known in the art. Individual partition panels or other demountable partition systems are interconnected in different configurations to form separate offices, workstations, or work settings. For such an office division system to be practical and usable for office workers, provisions must also be incorporated in such systems for the routing and delivery of office utilities to the individual work areas. Typically, office utilities are either preassembled within individual office panels, or are routed along raceways positioned at the top or bottom of the panel whereby user accessible outlets are provided at regularly spaced intervals. More recent, demountable wall systems incorporate a beltway positioned at worksurface height in which a modular utility distribution system is housed to provide office utilities such as electrical power, data, and communications at user access ports located at spaced intervals along the beltway. However, the placement of these user accessible outlets are often inconveniently positioned, inaccessible, or in insufficient quantity to fulfill the needs of the user.

As an attempted solution to alleviate the problems of inadequate accessibility of utility outlets, a variety of utility distribution modules have been introduced into the market. Generally, these modules incorporate within one housing a plurality of electrical outlets in combination with a plurality of data/communication connection outlets. The modules are then attached to or integrated with worksurfaces positioned within the individual workspaces of an office setting. These modules are typically mounted below the worksurface at a rear portion thereof such that accessibility by the user is gained either by an access door incorporated into the worksurface thereby dedicating valuable real estate for utility access or the user must inconveniently reach below and to a rear portion of the worksurface to gain access to the utility outlets.

Further, these utility distribution modules are generally preconfigured with a fixed number of utility outlets. Utility requirements of individual users usually is not consistent, and some users will require a large number of utility outlets while an adjacent user may have minimal requirements therefor. Single modules having a fixed number of utility outlets and a predetermined mounting position with respect to the worksurface detract from and run counter to the current trend of adaptability and flexibility of modular office systems designed to tailor the workspace to the needs of a particular user.

Thus, there is a need for a utility distribution mounting system which is tailorable to the individual needs of a workspace occupant. Further, such a utility delivery system should be tailorable with respect to its location within the workspace as well as tailorable to the quantity and configuration of utility outlets available to the user. Prior utility delivery systems have certain drawbacks and disadvantages, particularly with respect to the need for flexibility, positioning, and providing an optimum quantity of utility outlets for an individual user.

SUMMARY OF THE INVENTION

One aspect of the present invention is a modular mounting system for the delivery of office utilities from a utility distribution system of an office partitioning system to a worksurface position in an individual workspace. The modular utility mounting system comprises a mounting rail which includes an upper portion shaped for abutting attachment to a bottom surface of the worksurface an also includes a lower mounting portion which defines at least one mounting aperture therein. A utility distribution bracket is abutted to the lower mounting portion and includes a base and an upper frame connected to the base. The combined base and upper frame define a cavity shaped to closely receive a utility distribution block and further define at least one aperture for user access to the utility distribution block. The utility distribution bracket further includes an engagement member which extends through the mounting aperture of the mounting rail and closely engages the lower mounting portion of the mounting rail in a fastenerless fashion such that the utility distribution bracket is disengagable from the mounting rail and interchangeable with others of like utility distribution brackets.

Another aspect of the present invention is a modular utility system for the delivery of office utilities from an existing utility distribution system of an office partitioning system to a worksurface positioned in an individual workspace. The modular utility system comprises a mounting rail which includes an upper portion shaped for abutting attachment to a bottom surface of the worksurface and further includes a lower mounting portion defining at least one mounting aperture therein. A utility distribution module is abutted to the lower mounting portion of the mounting rail wherein the utility distribution module comprises a utility distribution block, a base abutted to a bottom of the utility distribution block and an upper frame connected to the base and defining with the base a cavity which closely receives the utility distribution block. The base and frame further define at least one aperture for user access to the utility distribution block and the upper frame includes an engagement member extending through the mounting aperture of the mount rail and closely engages a segment of the lower mounting portion of the mounting rail in a fastenerless fashion. The utility distribution module is disengagable from the mounting rail and interchangeable with others of like utility distribution brackets.

Yet another aspect of the present invention is a utility distribution kit particularly adapted for attachment to a worksurface positioned in an individual workspace for the delivery of office utilities from a utility distribution system of an office partitioning system. The utility distribution kit comprises at least one mounting rail which includes an upper portion shaped for abutting attachment to a bottom surface of the worksurface and also includes a lower mounting portion defining a plurality of mounting apertures arranged in a predefined pattern. Another element of the kit is at least one utility distribution module including a utility distribution block having a plurality of utility block connectors, a base which includes a plurality of apertures in a lower base surface and which is abutted to a bottom of the utility distribution block, and an upper frame connected to the base and defining therein a cavity closely receiving the utility distribution block. The base and the frame further define a plurality of apertures therearound for user access to the utility distribution block and the upper frame further includes an engagement member such that the engagement member can be extended through one of the mounting apertures for close engagement of a segment of the lower mounting portion of the mounting rail in a disengagable, fastenerless fashion. Another element of the kit is a conductive harness including a plurality of utility conductors having a harness connector terminated at one end thereof for connection to one of the utility block connectors of the utility distribution block and adapted at a second end for interconnection with the utility distribution system in the associated beltway.

These and other advantages of the invention will be further understood and appreciated by those skilled in the art by reference to the following written specification, claims, and appended drawings.

BRIEF DESCRIPTION OF THE DRAWINGS

FIG. 8 is a top view of the frame of the utility distribution module shown in FIG. 6.

FIG. 9 is a fragmentary, cross-sectional view of the locking clip of the frame shown in FIG. 8, taken along the line IX—IX, FIG. 8.

FIG. 10 is a top view of the base showing the apertures in an upper surface for receiving a mounting portion of the utility distribution block.

FIG. 11 is an end view of the utility distribution module shown in FIG. 6 showing the utility distribution block within the cavity formed by the frame and base.

FIG. 12 is a partial cross-sectional view of the lower mounting portion of the distribution block in engagement with the upper surface of the base.

FIG. 20 is a top view of the decorative face plate shown in FIG. 19.

FIG. 21 is a front view of the decorative face plate of FIG. 19.

FIG. 22 is a vertical partial cross-sectional view of a lower engagement tabs of the decorative face plate of FIG. 19 shown along the line XXII—XXII, FIG. 21.

FIG. 30 is a perspective view of a utility distribution module mounted to a mounting rail with a power-in harness connected to an end connector of the module showing the power-in harness adapted for a base connection.

FIG. 31 is a perspective view of a utility distribution module mounted to a mounting rail and having a power-in harness connected to an end connector of the utility distribution module wherein the opposite end of the power-in harness is adapted for an edge connection.

FIG. 32 is a perspective view of a utility distribution module mounted to a mounting rail and having a power-in harness connected to an end connector of the utility distribution module and having an opposite end adapted to interface with a utility distribution block of an existing utility distribution system.

FIG. 39 is a rear perspective view of the satellite utility box clamped to a rear edge of a worksurface.

FIG. 40 is an exploded, perspective view of an inverted satellite utility box engaging a mount plate for attachment to a bottom surface of the worksurface.

DETAILED DESCRIPTION OF PREFERRED EMBODIMENT

Figure 2:
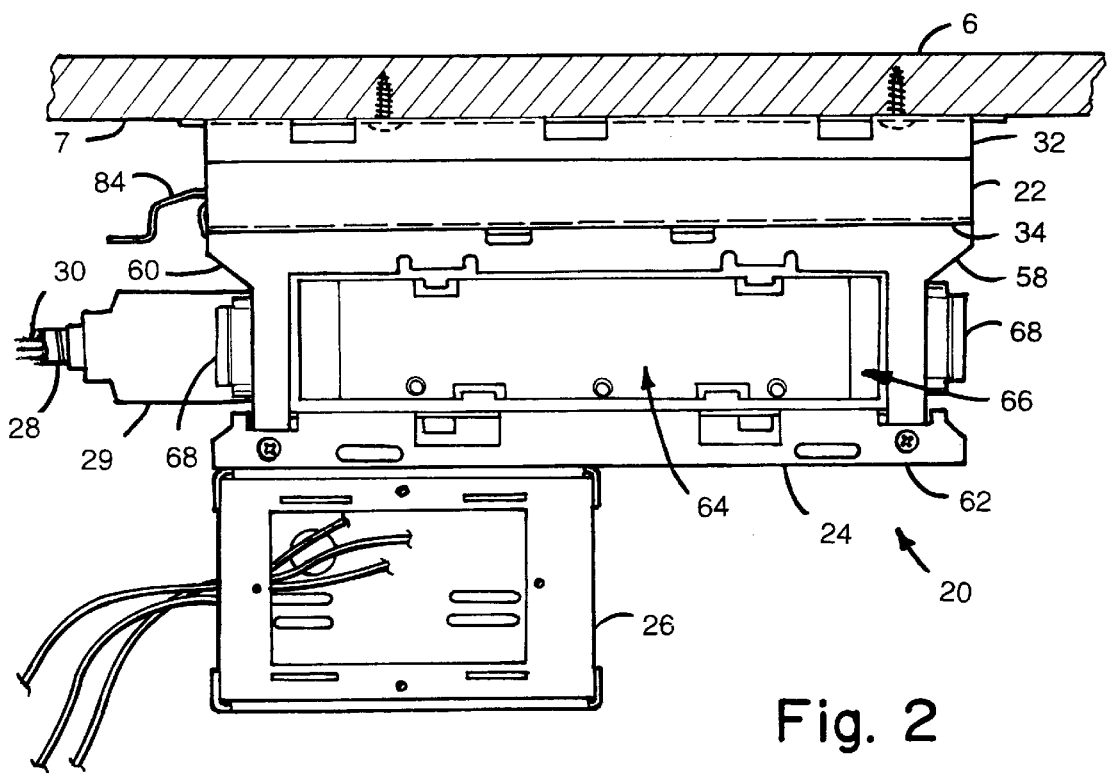
FIG. 2 is a front elevational view of the modular system mounted to a lower surface of a worksurface.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
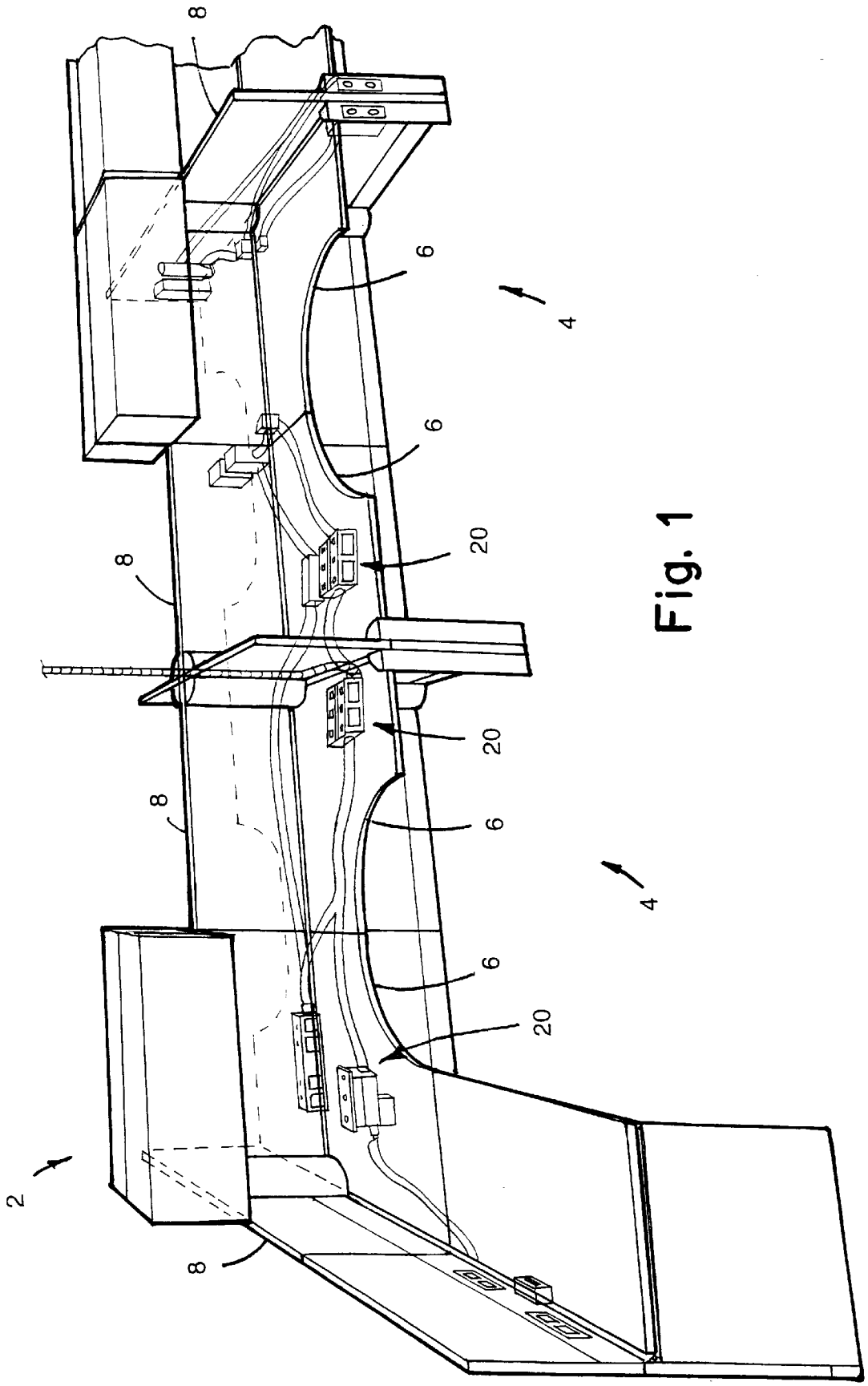
FIG. 1 is a perspective view of a modular office system dividing an open office area into individual workstations wherein a modular utility mounting system embodying the present invention is affixed to a bottom surface of the worksurfaces.

Turning to the drawings, FIG. 1 shows a modular office system 2 comprising partition panels 8 dividing an open office area into a plurality of individual workstations 4. Workstations 4 include therein at least one worksurface 6. Partitions 8 may incorporate a utility beltway 10 positioned at either the top or bottom of partitions 8 or alternatively, as shown, at substantially worksurface height. Utility beltway 10 typically incorporates therein at least one utility distribution block 12 for the supply of office utilities to workstation 4. A modular utility delivery system 20 according to a preferred embodiment is mounted below one or more of worksurfaces 6.

Modular utility system 20, most easily seen in FIG. 2, includes mounting rail 22 affixed to a bottom surface 7 of worksurface 6. A utility distribution module 24 is abutted to and depends from mounting rail 22 and a data distribution box 26, in turn, depends from utility distribution module 24. Utilities are supplied to modular utility system 20 and in particular to utility distribution module 24 with utility harness 28 having a plurality of utility conductors 30 and a connector 29 which is connected to a utility connector 68 of utility distribution module 24. Those skilled in the art will appreciate that the configuration disclosed in FIG. 2 is merely representative of one of the many configurations available in which to configure modular utility system 20 at a particular workstation 4.

Figure 3:
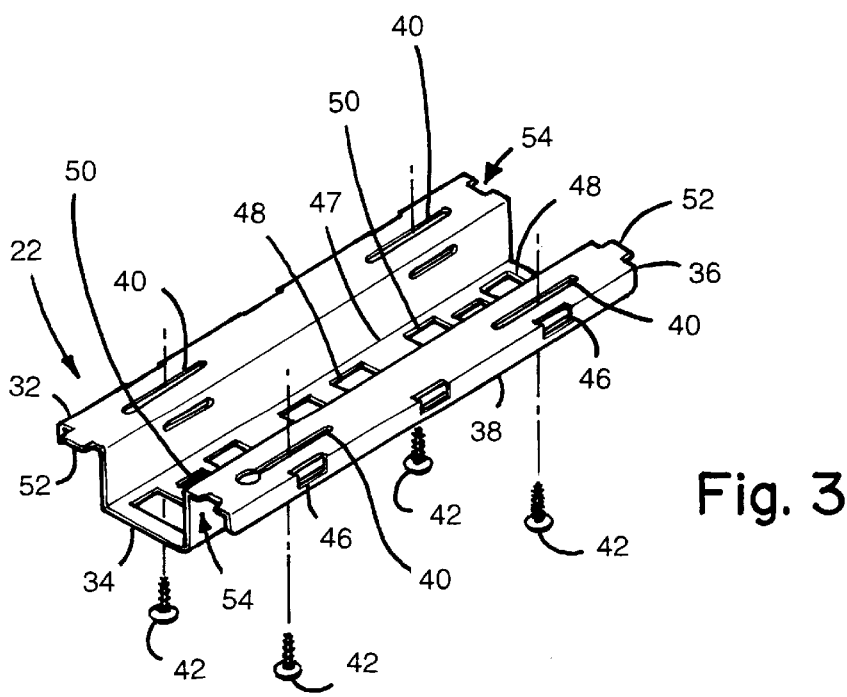
FIG. 3 is a perspective view of the mounting rail.
Figure 4:
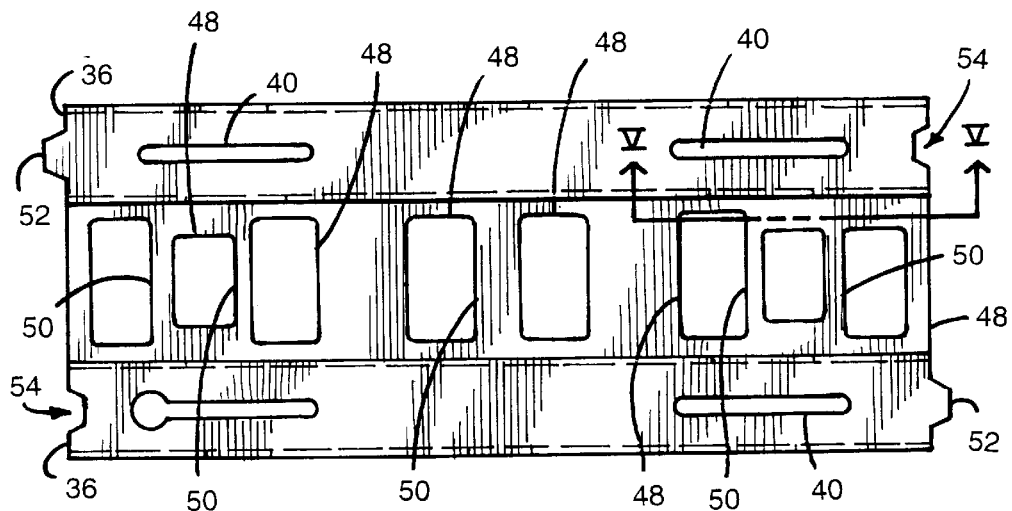
FIG. 4 is a top view of the mounting rail shown in FIG. 3.
Figure 5:
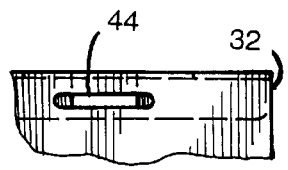
FIG. 5 is a fragmentary elevational view of the inside face of the mount rail shown in FIG. 4 taken along the line V—V, FIG. 4.

Turning to FIGS. 3–5, mounting rail 22 in its preferred embodiment has an inverted hat-shaped cross section having an upper portion 32 adaptively shaped for abutting attachment to a lower surface 7 of worksurface 6. Outer horizontally extending flanges 36 of upper portion 32 have outer depending edges 38 and further include longitudinal slots 40 which are sized to receive screws 42 for the mounting of mounting rail 22 to worksurface 6. Upper portion 32 of mounting rail 22 also includes accessory slots 44 and accessory apertures 46 which can be utilized for the mounting of accessories to mounting rail 22. Each horizontally extending flange 36 has an alignment tab 52 at one end thereof and an alignment notch formed in an opposite end thereof. Tabs 52 and notches 54 are arranged in such a manner as to render mounting rails 22 hermaphroditically mateable when abutted in an end-to-end relationship. Mounting rail 22 also includes lower mounting portion 34 having, in its preferred embodiment, a plurality of mounting apertures 48 formed within the horizontal crown 47 of lower mounting portion 34. Mounting apertures 48 are formed in crown 47 and spaced in a predetermined pattern to accept mounting provision of accessories to depend therefrom as more fully described below. Mounting apertures 48 are interspaced therebetween with mounting segments 50 of horizontal crown 47.

Figure 6:
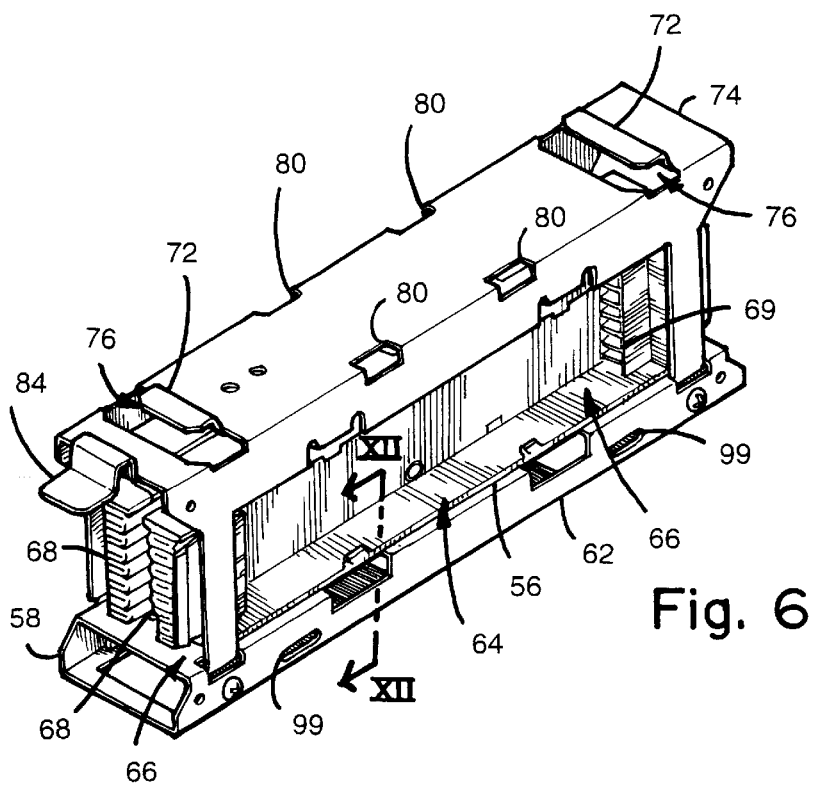
FIG. 6 is a perspective view of a utility distribution module.
Figure 7:
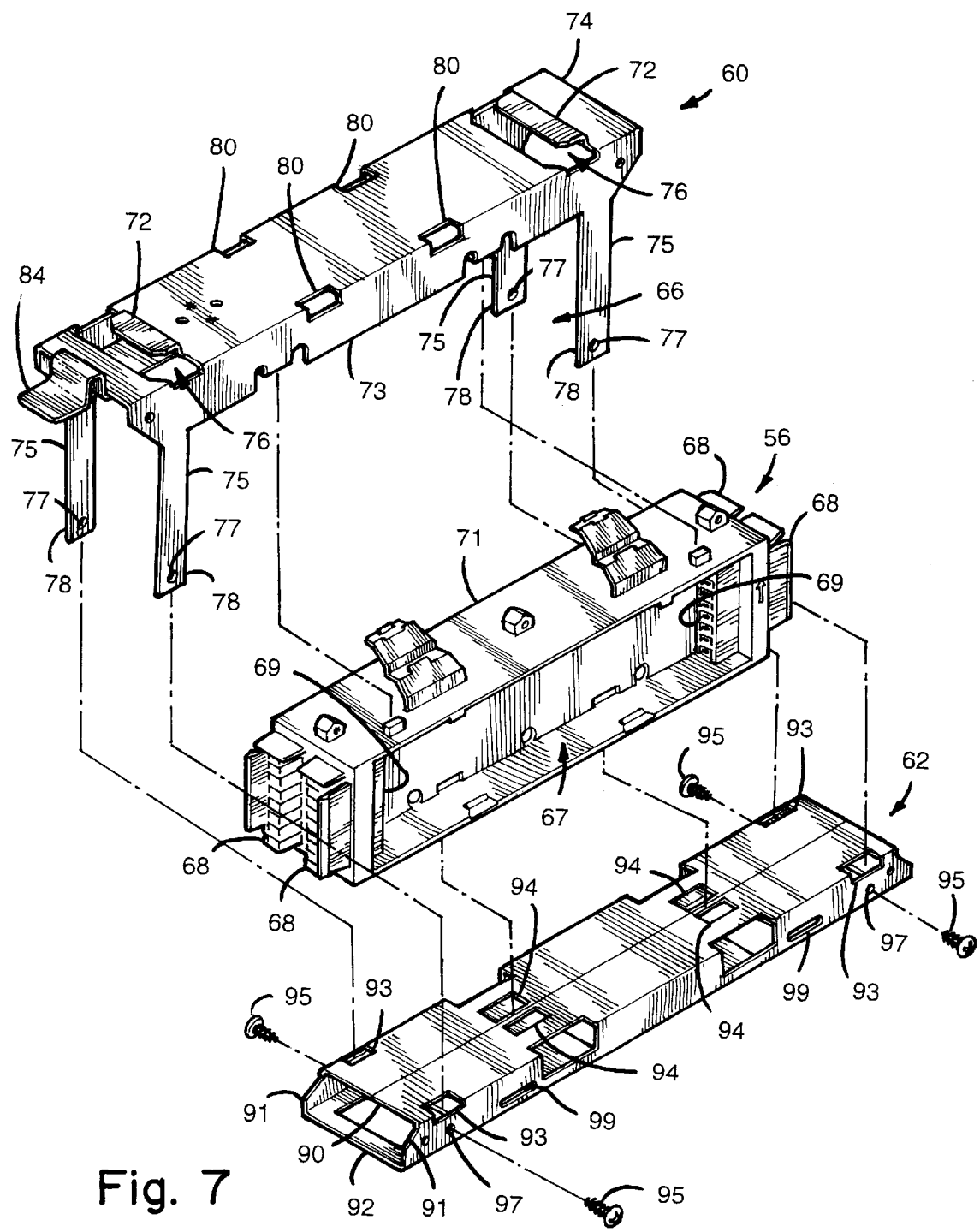
FIG. 7 is an exploded, perspective view of the utility distribution module shown in FIG. 6, showing the frame, the utility distribution block, and the base.

As shown in FIGS. 6 and 7, utility distribution module 24 comprises a utility distribution block 56 housed within utility distribution bracket 58. Utility distribution bracket comprises an upper frame 60 and a base 62 forming a cavity 64 therein which receives utility distribution block 56. Utility distribution bracket 58 has a plurality of apertures 66 therearound to permit user access to the utility connectors 68 at the ends of utility distribution block 56 and module recess 67.

As most clearly shown in FIG. 7, upper frame 60 comprises an upper frame surface 74 having flanges 73 depending laterally therefrom. Legs 75 generally positioned proximate to the ends of flanges 73 further depend therefrom. Legs 75 each have a hole 77 therethrough proximate to a bottom end 78 of legs 75. Upper frame 60 also includes engagement member 70 for mounting to mounting rail 22. In the preferred embodiment, engagement member 70 comprises two mount clips 72 which are generally horizontal to and disposed above upper frame surface 74 thereby defining horizontal slot 76 therebetween. The displacement of mount clip 72 above upper frame surface 74 is such so as to closely receive in horizontal slot 76 mounting segment 50 of mounting rail 22. Upper frame member 60 further includes at least two frame apertures 80 on each side thereof to receive upper mounting tabs 138 (FIG. 20) of a decorative face plate 130 (FIG. 21) as described more fully herein.

As shown in FIGS. 8 and 9, locking clip 84 comprises a vertical locking surface 85 which extends upwardly from a horizontal leg 86. Horizontal leg 86 has at an end opposite vertical locking surface 85 two locating dimples 87 for proper positioning of locking clip 84 to upper surface 74 of upper frame 60. Dimples 87 generally nest within apertures 88 of upper frame surface 74 and is laterally centered about the longitudinal axis of upper frame 60 and longitudinally positioned such that vertical locking surface 85 is generally coplanar with the end 82 of upper frame 60.

As also shown in FIG. 7, utility distribution block 56 comprises a body 71 which is typically formed of a moldable resin in which utility conductors and interfacing contacts (not shown) are housed. In its preferred embodiment, utility distribution block 56 includes two utility connectors 68 at each end thereof and at each of its lateral sides has a module recess 67 having a module interface 69 at each end thereof. Utility distribution block 56 is typically identical to utility distribution block 12 found in utility beltway 10; however, utility distribution bracket 58 can be configured to receive a utility distribution block of any suitable utility distribution system.

FIGS. 7 and 10 show base 62 formed in a generally rectilinear cross-sectional configuration having an upper base surface 90 and a lower base surface 92 which are vertically separated by side walls 91. Upper surface 90 has two pairs of block apertures 94 formed therein wherein apertures 94 of each pair are laterally separated by locating segment 96. Each pair of apertures 94 is laterally centered in upper base surface 90 and are longitudinally disposed one from the other to correspond to mounting provisions on utility distribution block 56 as described more fully below. Upper base surface 90 also defines a plurality of mating apertures 93, each aperture 93 located proximate to the corners of base 62 for receiving bottom leg portions 78 of frame 60. Side walls 91 also have therein a hole 97 below each of mating apertures 93. Lower base surface 92, as shown in FIG. 10, has formed therein a plurality of mounting apertures 98 which correspond in size and position with mounting apertures 48 of mounting rail 22.

Referring now to FIG. 12, to assemble utility distribution module 24, a bottom portion 102 of utility distribution block 56 is abutted to upper base surface 90 of base 62. Utility distribution block 56 has depending from block bottom 102 of body 71 two pair of depending fingers 104 which define therebetween slot 106. Fingers 104 are received within block apertures 94 in upper base surface 90 such that locating segment 96 of upper base surface 90 is closely received in slot 106 formed by fingers 104. Closely received segment 96 provides lateral stability to utility distribution block 56 thereby preventing lateral movement of utility distribution block 56 when utility plugs are engaged and disengaged from utility distribution block 56. To complete the assembly of utility distribution module 24, upper frame 60 is placed over the combined distribution block 56 and base 62 such that leg bottoms 78 of upper frame 60 are received in mating apertures 93 of base 62 and are secured thereto with fasteners 95 engaged within holes 77 and 97 of upper frame 60 and base 62, respectively. As seen in FIGS. 6, 7 and 11, combined upper frame 60 and base 62 define cavity 64 wherein utility distribution block 56 is received and also define a plurality of apertures 66 therearound for user access to utility connectors 68 and module recess 67 of utility distribution block 56.

Figure 13:
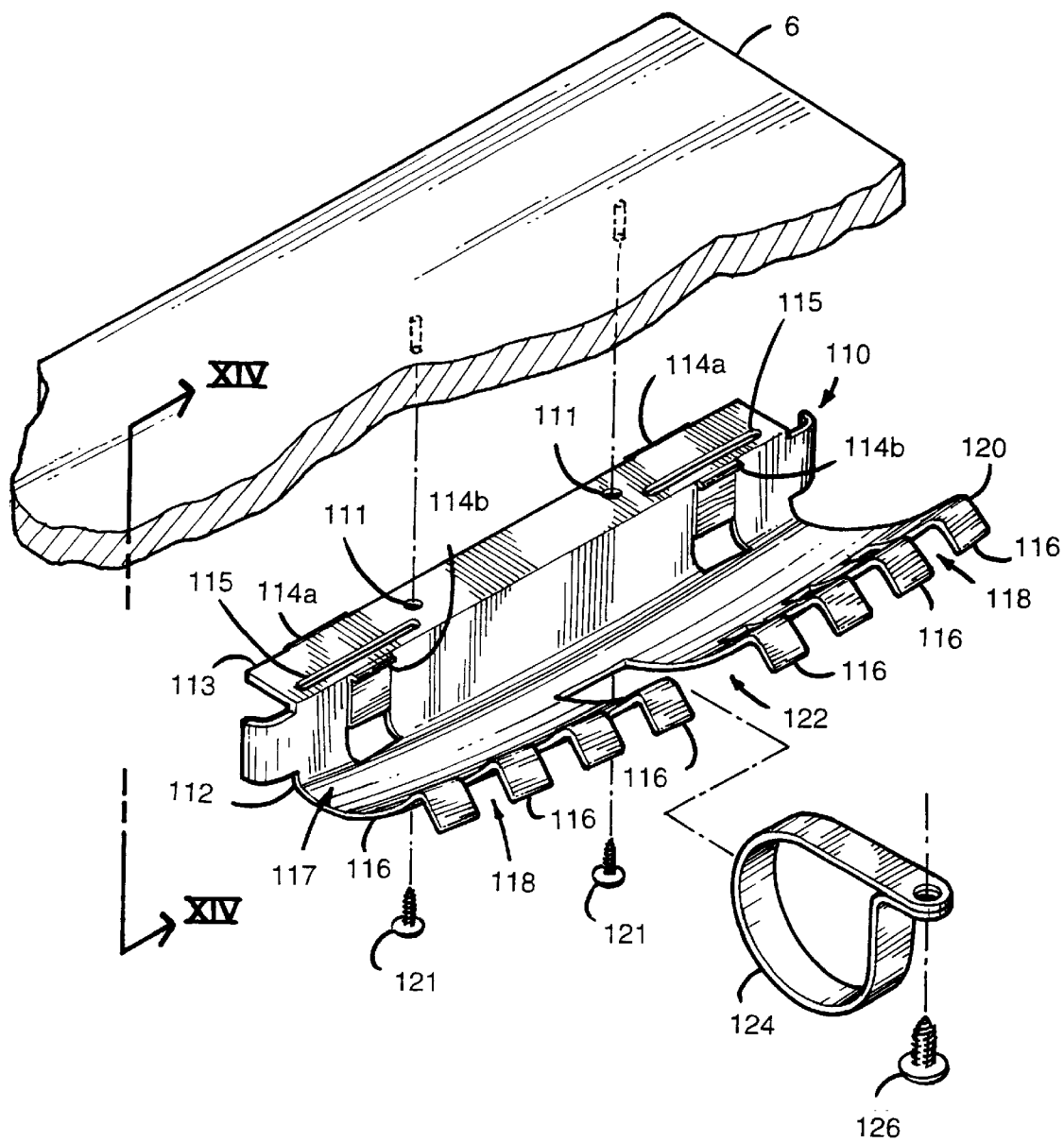
FIG. 13 is an exploded, perspective view of a wire management bracket affixed to the bottom surface of the worksurface.
Figure 14:
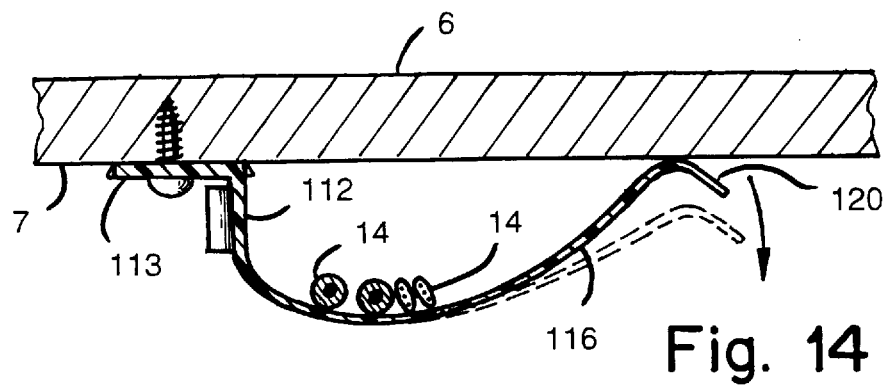
FIG. 14 is an end view of the wire management bracket shown in FIG. 13 attached to the lower surface of the worksurface.
Figure 15:
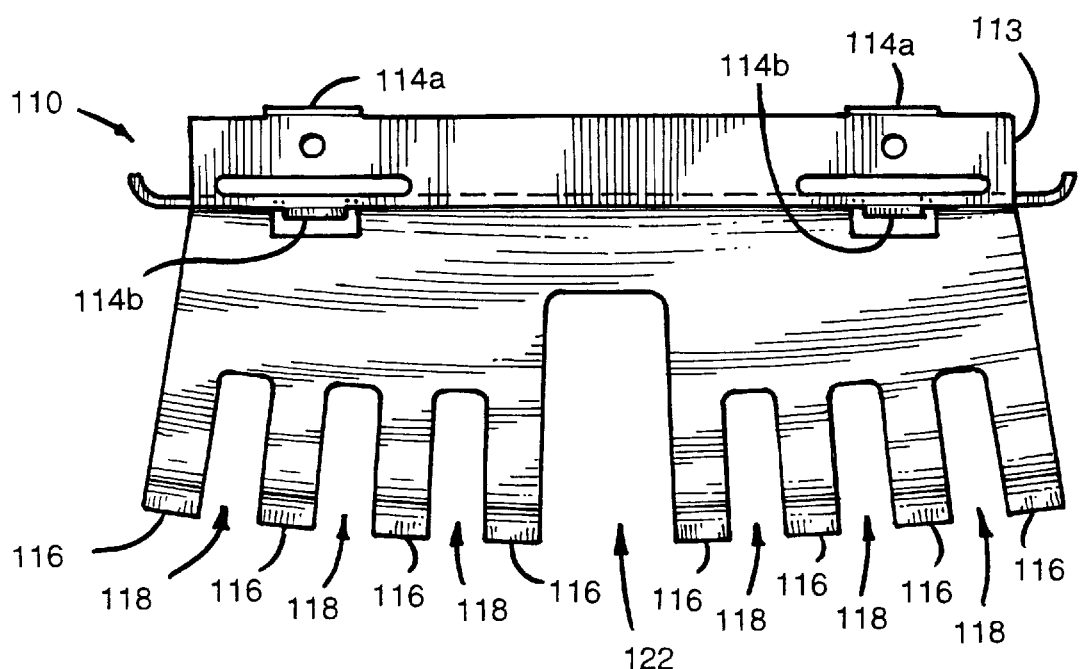
FIG. 15 is a top view of the wire management bracket shown in FIG. 13.
Figure 16:
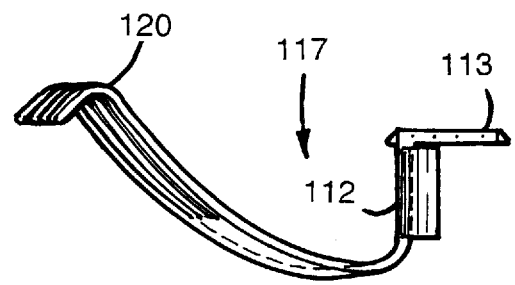
FIG. 16 is an end view of the wire management bracket shown in FIG. 13.
Figure 17:
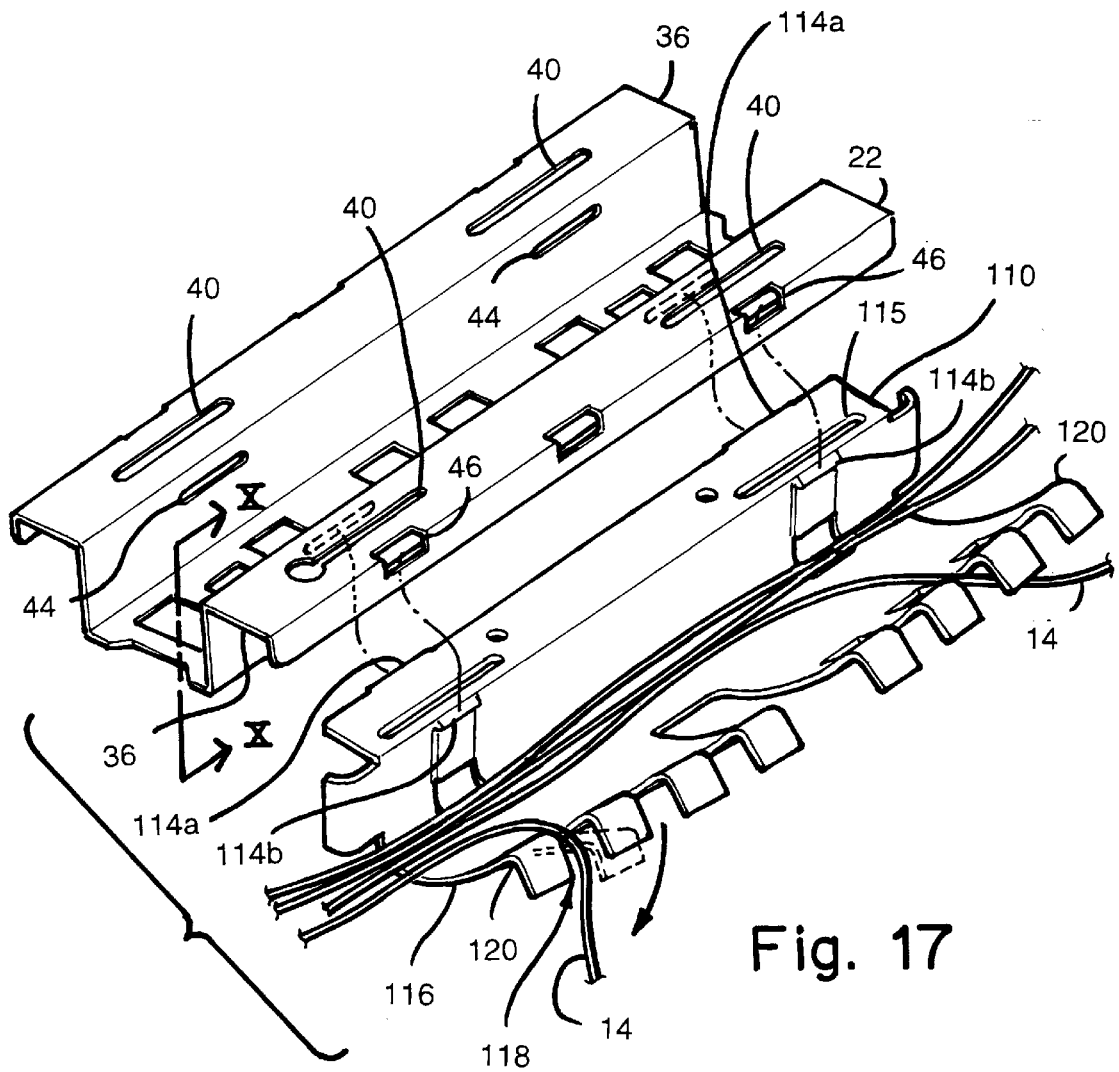
FIG. 17 is an exploded, perspective view of the wire management bracket of FIG. 13 attached to the mounting rail of FIG. 2 and further showing wires extending between individual fingers of the wire management bracket.

FIG. 13 shows a wire management bracket 110 attached to bottom surface 7 of worksurface 6. Wire management bracket 110, as illustrated in FIGS. 13–16, in its preferred embodiment comprises vertical web 112 having at an upper portion thereof an upper horizontal surface 113 adapted for abutting lower surface 7 of worksurface 6. Upper surface 113 includes therein holes 111 to receive fasteners 121 for attachment to worksurface 6, and also includes attachment tabs 114a and 114b extending from the side edges 119 of upper horizontal surface 113. A plurality of resilient fingers 116 extends outwardly and upwardly in a curved fashion from a lower portion of vertical web 112 wherein resilient fingers 116 have curved finger ends 120 formed to abut lower surface 7 of worksurface 6. Vertical web 112 and resilient fingers 116 define therein a horizontally extending trough 117 in which can be routed utility wires 14 to provide for the orderly management of utility wires 14 associated with office appliances and the like. Resilient fingers 116 are laterally spaced apart one from another forming slots 118 between adjacent ones of fingers 116 such that one or more utility wires 14 may be routed therebetween for the convenience of the user as shown in FIG. 17. A central notch 122 is formed at a midpoint of wire management bracket 110 wherein notch 122 is generally larger in size than slots 118 and adapted to accommodate therein clamp 124. Clamp 124 is typically a standard wire management clamp which is generally circular in cross section but may also be of rectilinear or other cross-sectional shape and is independently fastened to worksurface 6 by fasteners 126.

Figure 18:
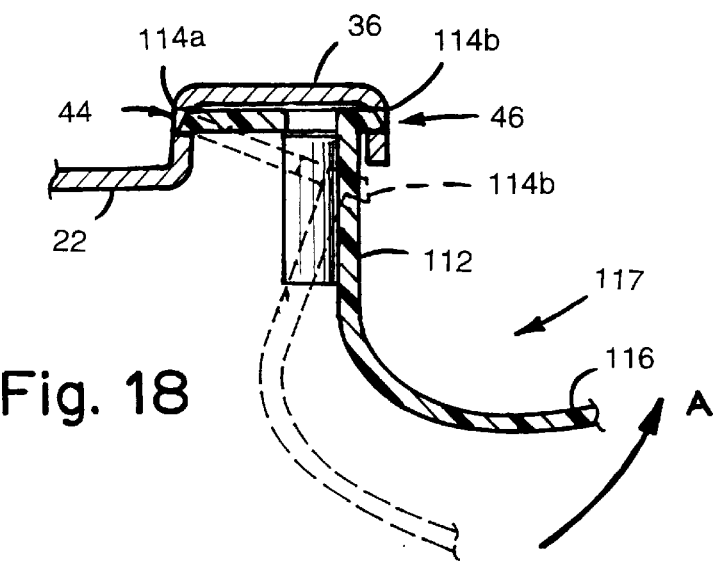
FIG. 18 is a partial end view of the combined mounting rail and wire management bracket showing the snap-in feature to mount the wire management bracket to the mounting rail.

As shown in FIGS. 17 and 18, wire management bracket 110 can also be utilized in combination with mounting rail 22 to provide management of utility wires running proximate to modular utility system 20. As an alternate to the mounting of wire management bracket 110 directly to lower surface 7 of worksurface 6, rear attachment tabs 114a are inserted into accessory slots 44 of mounting rail 22 and wire management bracket 110 is then rotated in direction A as shown in FIG. 18 until front attachment tabs 114b become engaged in accessory apertures 46 of depending edges 38. Wire management bracket 110 also includes slots 115 in upper surface 113 which correspond positionally to slots 40 in mounting rail 22 to accommodate screws 42 for attachment of mounting rail 22 to lower surface 7 of worksurface 6 as shown in FIG. 3. Since mounting rail 22 has like flanges 36 and 38 on either side thereof, a wire management bracket 110 can, at the option of the user, be attached on one or both sides of mounting rail 22.

Figure 19:
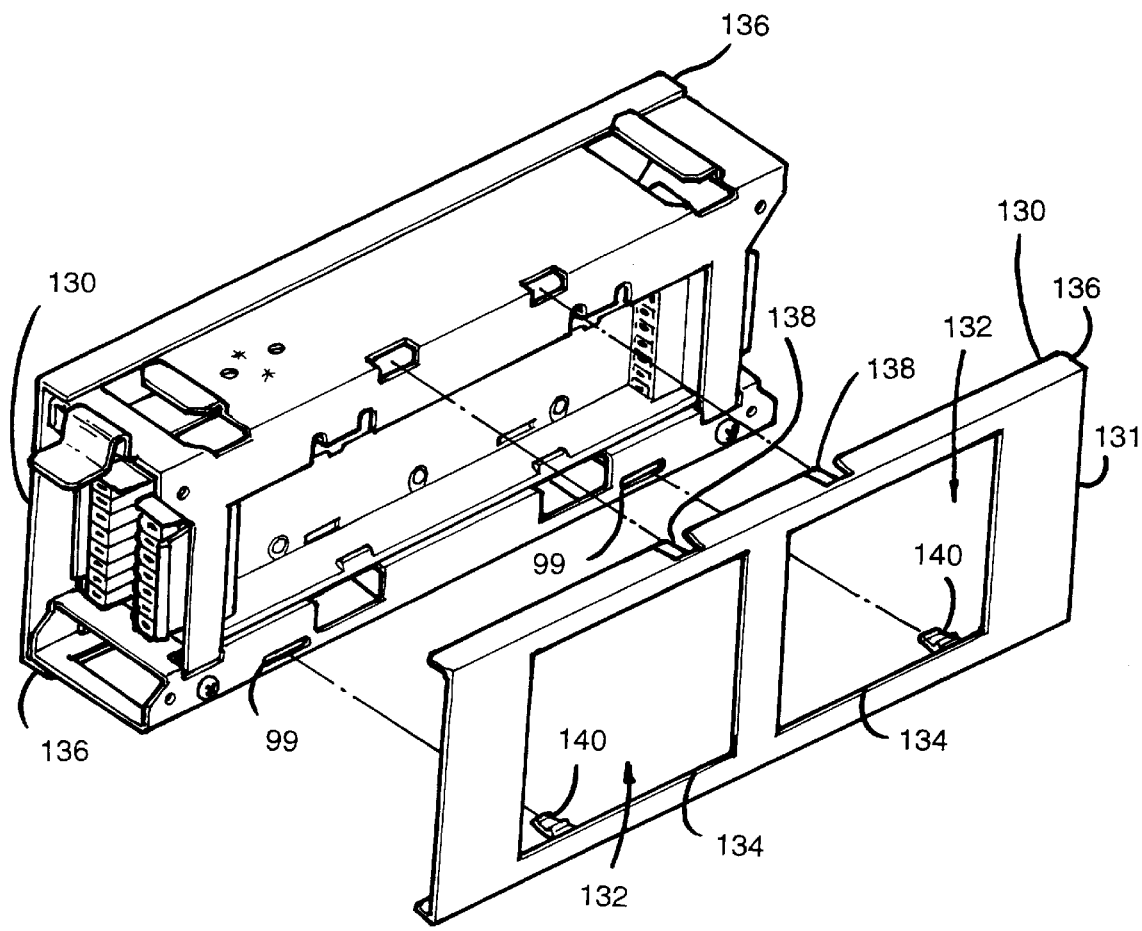
FIG. 19 is a perspective view of the utility distribution module of FIG. 6 showing the attachment of a decorative face plate thereto.

Referring now to FIG. 19, a decorative cover 130 is shown which can be attached to a lateral face of utility distribution module 24 in a snap-on fastenerless fashion such that decorative cover 130 can be readily added or removed by the user. Decorative cover 130 includes vertically oriented front face 131 which has knockout segments 134 which, when removed from decorative cover 130, define module apertures 132 in front face 131. Decorative cover 130 also has rearwardly extending lips 136 at an upper and lower edge thereof to decoratively cover utility distribution module 24.

As further shown in FIGS. 20–22, decorative cover 130 also includes a plurality of upper and lower locking tabs 138 and 140, respectively, for engagement in frame apertures 80 and base apertures 99 of utility distribution module 24, respectively. As shown in FIG. 22, lower locking tab 140 is vertically disposed above lip 136 and extends rearwardly from face 131 and also includes one or more protrusions 142 on an upper surface thereon for engaging an edge of base 62 which defines a portion of base aperture 99. In its preferred embodiment, decorative cover 130 is molded of a resilient resin such that tab 140 which extends rearwardly from face 131 in a cantilevered fashion engages an edge of base 62 which defines base aperture 99. In a like manner, upper locking tabs 138 also extends rearwardly from face 131 in a cantilevered fashion and have downwardly depending protrusions 142 for engagement of an edge of upper frame 60 which defines a portion of frame apertures 80. Face 131 of decorative cover 130 can also be contoured as desired by the manufacturer.

Figure 23:
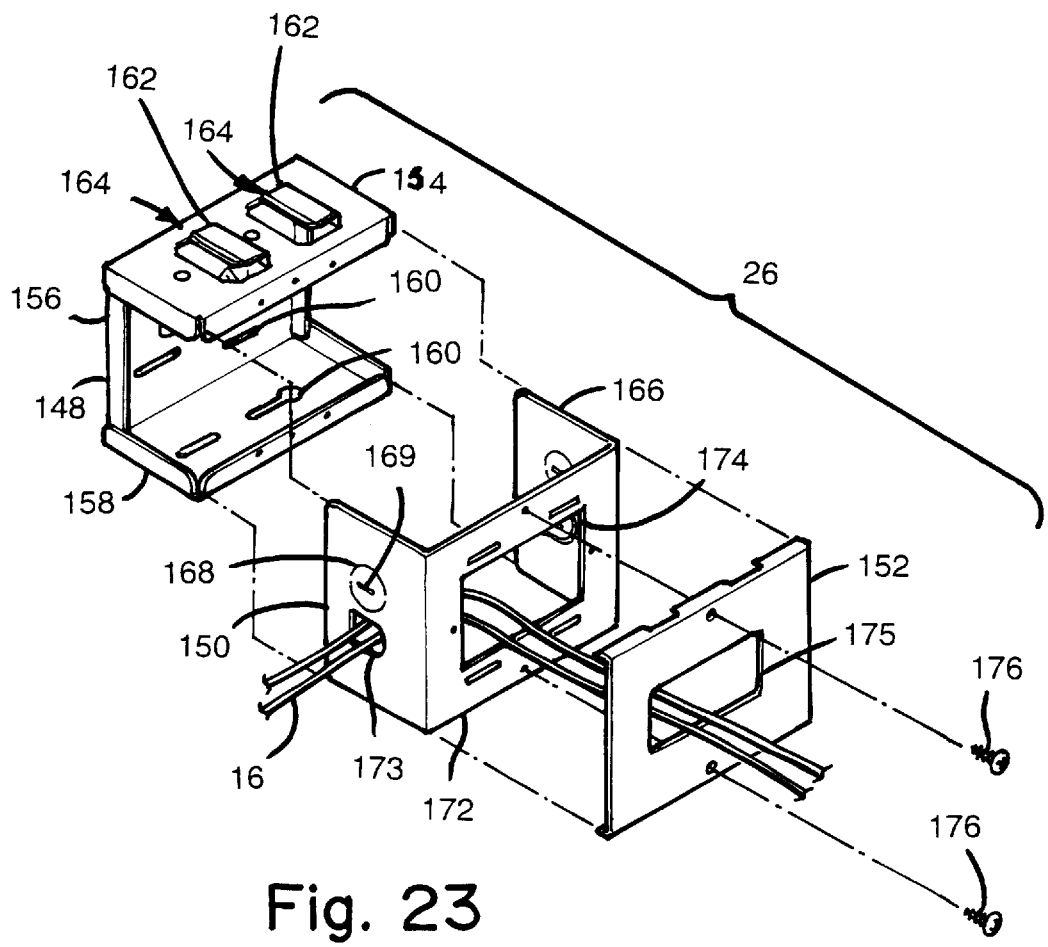
FIG. 23 is an exploded, perspective view of a data distribution box adapted to receive a data distribution block.
Figure 24:
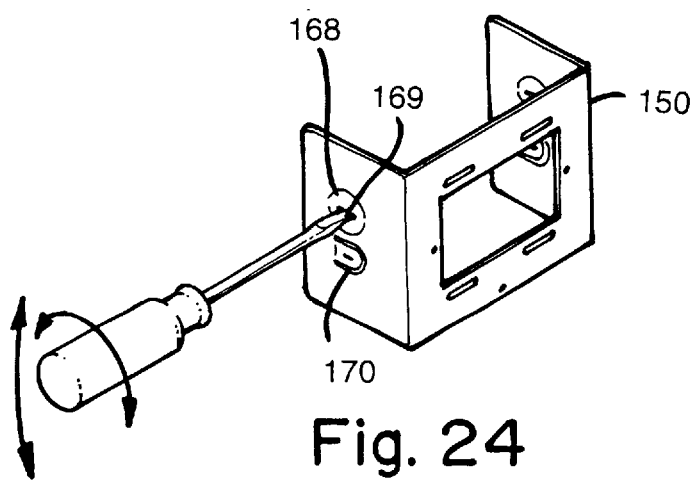
FIG. 24 is a perspective view of the data distribution block chassis cover showing the alternative means of conductor routing into the box.

Referring now to FIGS. 23 and 24, a data distribution box 26 and comprises a chassis 148, a chassis cover 150, and a decorative cover 152. Chassis 148 includes a chassis top 154 having formed therein one or more mount clips 162 defining in combination with chassis top 154 horizontal slots 164 therebetween. Mount clips 162 are disposed on chassis top 154 in such a manner as to facilitate the attachment of chassis 26 to either mounting rail 22 or lower base surface 92 of base 62 wherein clips 162 are inserted in mounting apertures 48 or 98 and engage mounting segments 50 or 100 of mounting rails 22 or base 62, respectively. Chassis 148 also includes a back 156 and a bottom 158, each of which has formed therethrough slots 160. Chassis cover 150 is typically formed in a U-shape comprising a chassis front 172 and rearwardly extending chassis sides 166 from each end of chassis front 172. Each chassis side 166 has a knockout 168 and a tie tab 170 generally centrally positioned therein. Knockout 168 can be readily removed from chassis side 166 by inserting a screw driver in slot 169 and twisting knockout 168 for its removal. The resulting aperture from the removal of knockout 168 can be utilized for the attachment of a wire conduit for the routing of data/communication wires 16 therethrough to an interior portion of chassis 26. Alternatively, tie tab 170 having a hole centrally located therethrough can be bent at right angles to chassis side 166 thereby creating aperture 173 for the routing of data/communication wires 16. Wires 16 may be secured with respect to cover 150 by tying the wires utilizing conventional tie straps which encompass wires 16 and pass through hole 171. Chassis front 172 in its preferred embodiment has a rectilinear aperture 174 which is sized to accept the mounting of a data/communication distribution block (not shown). Such data/communication distribution blocks are of a readily available commercial configuration. Decorative cover 152 in its preferred embodiment is molded from a resilient moldable resin and has a rectilinear aperture 175 therein to permit access to the receptacles of the data/communication distribution block (not shown) and is attached to chassis 26 with fasteners 176 which in the preferred embodiment are screws.

Figure 25:
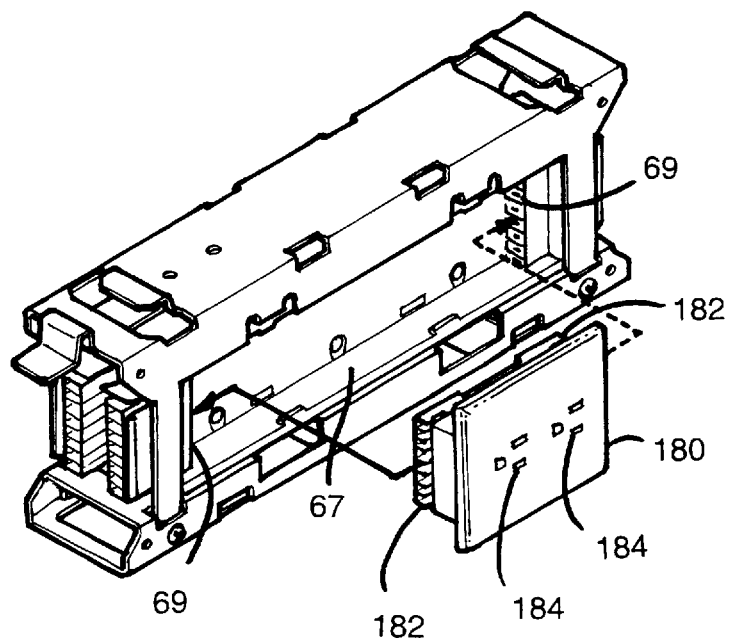
FIG. 25 is a perspective view of the data distribution module of FIG. 6 showing the insertion of a duplex module in the side recess of the data distribution block.

Turning now to FIG. 25, a utility distribution module 24 is shown wherein a duplex utility module 180 is received in module recess 67. In its preferred embodiment, utility distribution module 24 can accept two duplex utility modules within each recess 67. Duplex utility module has a block interface 182 at each end thereof for mating engagement with module interface 69 at either end of recess 67. Duplex utility module 180 further includes two receptacles 184 which are configured to receive the utility plugs of office appliances. To install duplex utility module 180, a user inserts module 180 in recess 67 along an axis parallel to a lateral axis of utility distribution module 24 and then slides duplex utility module 180 longitudinally until terminal interface 182 is completely engaged in module interface 69. Duplex utility module 180 has a plurality of contacts (not shown) therein to engage the requisite power, neutral, and ground contacts of utility distribution module 24 to provide a desired utility circuit for use by the office utilities employed by the user.

Figure 26:
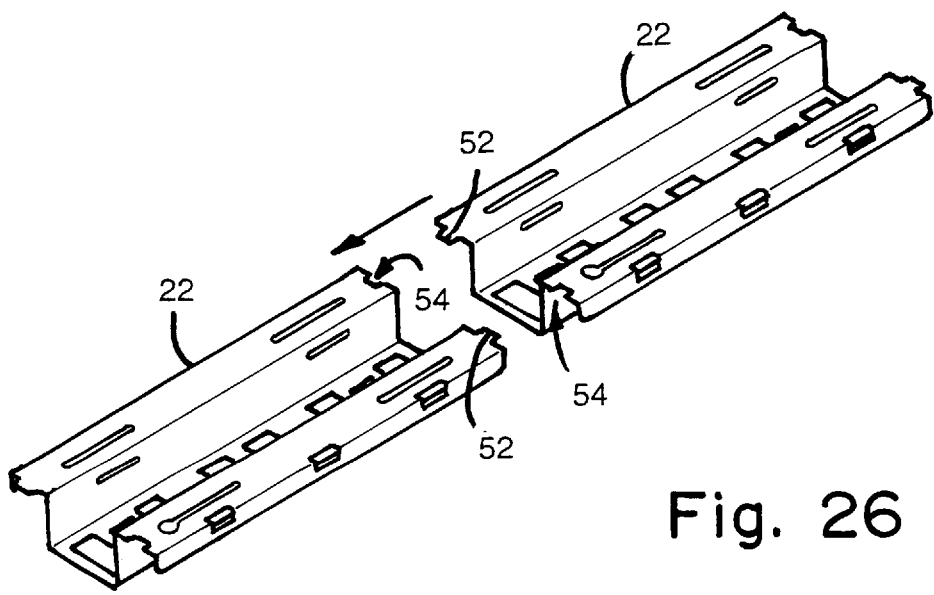
FIG. 26 is a perspective view of two mounting rails in an end-to-end abutting relationship showing the interaction of respective alignment tabs to properly align the mounting rails.

FIG. 26 illustrates the hermaphroditic alignment of longitudinally successive mounting rails 22 wherein alignments tabs 52 one rail 22 are received in alignment notches 54 of adjacent mounting rails 22.

Figure 27:
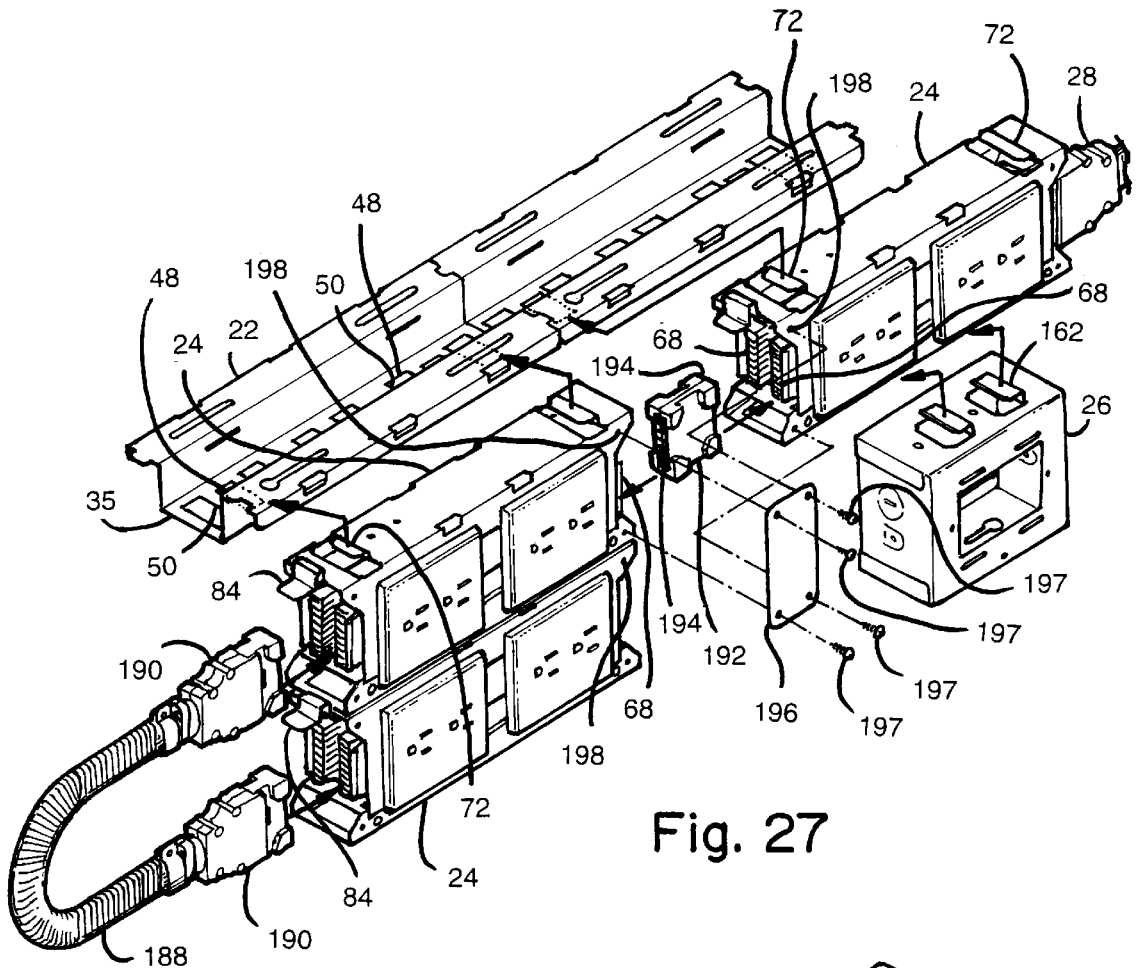
FIG. 27 is an exploded, perspective view of two mounting rails in an end-to-end relationship with a plurality of utility distribution modules attached thereto and interconnected one to the other and further including a data distribution box depending from one of the utility distribution modules.

FIG. 27 illustrates a typical configuration of utility distribution modules 24 and data distribution boxes 26 combined in a horizontal and vertical configuration. In the illustrated configuration, two mounting rails 22 are engaged in an end-to-end configuration whereby mounting clips 72 of each uppermost utility distribution module 24 are inserted through mounting apertures 48 and engage mounting segments 50 of each of mounting rails 22. The engagement of mounting segments 50 by mounting clips 52 permit configurations of utility distribution modules 24 in data distribution boxes 26 to be combined in a fastenerless fashion. However, those skilled in the art will appreciate that modules 24 and boxes 26 can be affixed one to the other and to mounting rails 22 using fasteners in a conventional manner. An in-line utility connector 192 having a connector interface 194 at each end thereof for mating engagement with end utility connectors 68 of horizontally adjacent utility distribution modules 24 interconnects the uppermost utility distribution modules 24. Splice plate 196 bridges in-line connector 192 and fasteners 197 are inserted therethrough to engage holes 198 on the adjacent ends of uppermost utility distribution modules 24. Locking clip 84 of the leftmost utility distribution module 24 engages end 35 of the leftmost mounting rail 22 to lock leftmost distribution module 24 in a fixed relationship with mounting rail 22. In a like manner, a lower utility distribution module 24 is attached to upper leftmost utility distribution module 24 such that locking clip 84 of the lower utility distribution module 24 engages an end of superjacent upper leftmost utility distribution module 24. A jumper harness 188 having harness connectors 190 which engage end utility connectors 68 of the upper and lower leftmost utility distribution modules 24 provide a continuous feed of utilities between utility distribution module 24. Utility harness 28 is connected to a utility connector 68 of rightmost utility distribution module 24 for the supply of utilities to the combined distribution configuration. A data distribution box 26 is shown depending from upper rightmost data distribution module 24 such that mounting clips 162 of data distribution box 26 engage mounting apertures 98 and mounting segments 100 of base 62 of upper rightmost utility distribution module 24. While FIG. 27 illustrates that utility distribution module 24 and data distribution box 26 are mounted to their respective superjacent structures in a right-to-left engaging manner, modules 24 and distribution boxes 26 can also be reversed and mounted in a left-to-right manner as a function of the symmetrical pattern of mounting apertures 50 and 98 in mounting rail 22 and base 62 respectively. Modules 24 and distribution boxes 26 are thus bi-directionally mountable.

Figure 28:
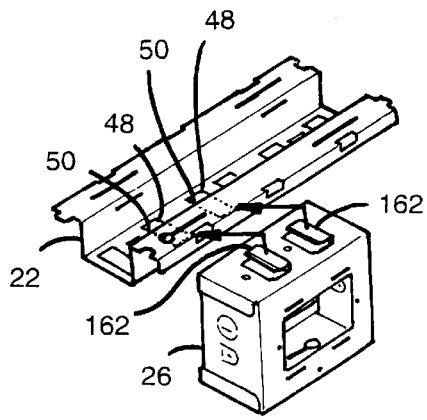
FIG. 28 is an exploded, perspective view of a data distribution box mounted directly to a mounting rail.
Figure 29:
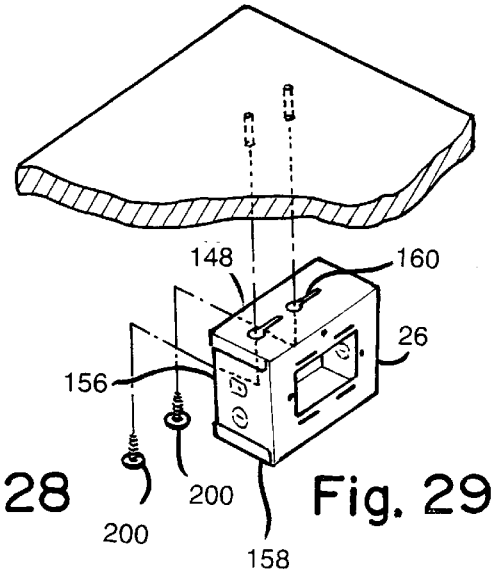
FIG. 29 is a perspective view of a data distribution box chassis illustrating an alternate attachment directly to either a vertical or horizontal surface.

FIGS. 28 and 29 illustrate alternate mountings of data distribution box 26. As shown in FIG. 28, data distribution box 26 can be mounted directly to mounting rail 22 by inserting mounting clips 162 through mounting apertures 48 and engaging mounting segments 50 of mounting rail 22. One or two data distribution boxes 26 can be mounted to each mounting rail 22. Alternatively, as shown in FIG. 29, data distribution box 26 can be mounted directly to either a vertical or horizontal surface such as worksurface 6 using fasteners 200 for insertion through slots 160 in either the back 156 or the bottom 158 of chassis 148.

FIGS. 30–32 illustrate alternate configurations of utility harness 28 for supplying utilities to modular utility system 20 and designated respectively as 28a, 28b, and 28c. Each configuration of utility harness 28 has a harness connector 202 which is adapted to connect to utility connector 68 of a utility distribution module 24. Harness 28a as depicted in FIG. 30 is a harness uniquely designed for use with the modular system 20 having an opposite end 204 wherein individual conductors 206 are unterminated for connection with a base mounted junction box 18 associated with the building structure. As shown in FIG. 31, harness 28b can be modified from a wire harness associated with a utility system housed within beltway 10 by removing a connector from one end thereof to reveal individual conductors 210 at opposite end 208 for connection within junction box 18. Utility harness 28c as shown in FIG. 32 has a harness end 212 terminated with an adaptor 214 which is configured for interconnection with a utility distribution block 12 positioned within utility beltway 10 of modular office system 2. Adaptor 214 is specifically configured to replace a module (not shown) such as duplex utility module 180 and engage module interface 69 in recess 67 of a distribution block 12 substantially identical to utility distribution block 56.

Figure 33:
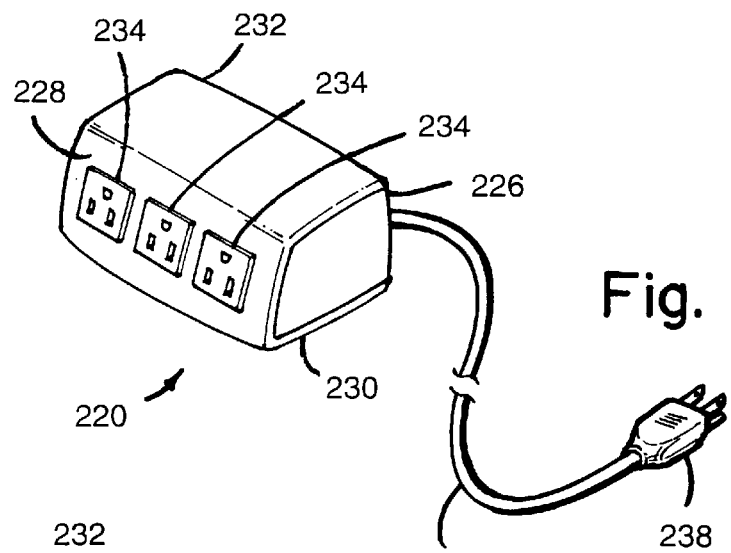
FIG. 33 is a perspective view of a satellite utility box which has a utility connector adapted to plug into the duplex module of FIG. 25.
Figure 34:
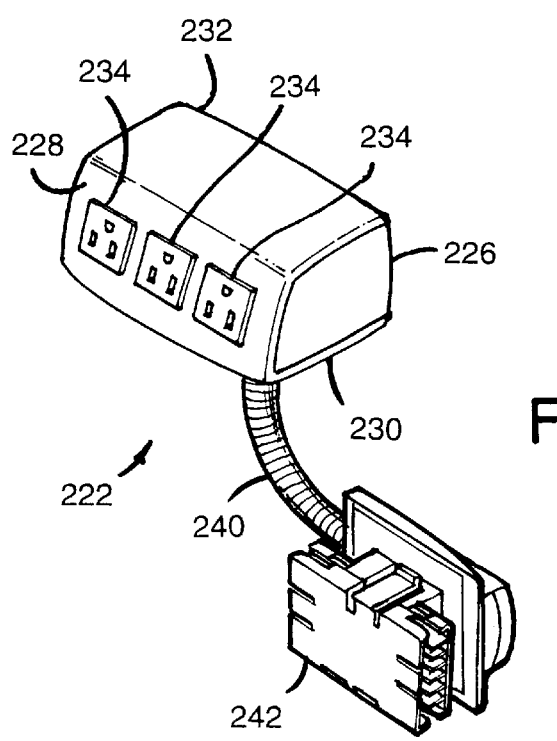
FIG. 34 shows a satellite utility box having a utility harness with a connector adapted to replace a duplex module of FIG. 25 in the utility distribution module.
Figure 35:
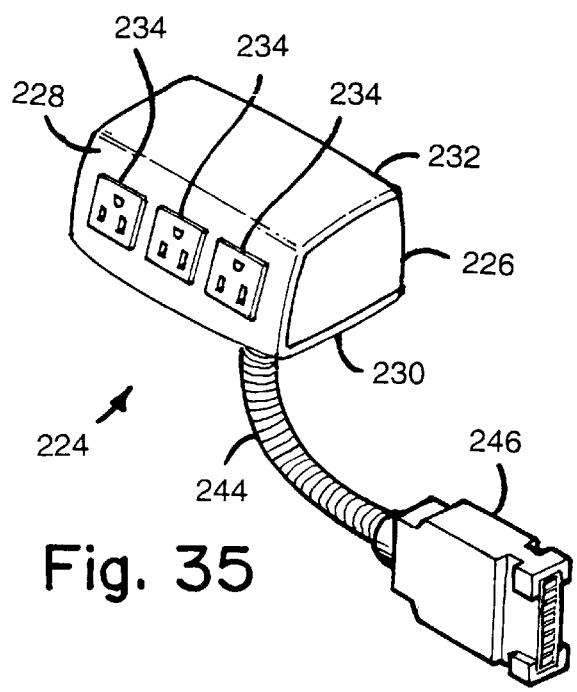
FIG. 35 shows a satellite utility box having a utility harness with a connector at its free end adapted to connect to an end connector of the utility distribution module.

FIGS. 33–35 illustrate three variations of a satellite utility box 220, 222, and 224. Each satellite utility box includes a chassis 226 having a front 228, a bottom 230, and a back 232. A plurality of utility receptacles 234 are housed within chassis 226 and extend through front 228 for access by a user thereof. Satellite utility box 220 has a utility cord 236 extending from the back 232 and terminating with a utility connector 238 which is particularly adapted to engage a utility receptacle 184 in duplex utility module 180 as shown in FIG. 25. Satellite utility box 222 as shown in FIG. 34 has a utility harness 240 extending from back 232 of chassis 226 whereby harness 240 is terminated at a free end with an adaptor 242 which is configured for engagement in module interface 69 of recess 67 of utility distribution module 24. The satellite distribution box 224 as shown in FIG. 35 has a utility harness 244 extending from back 232 of chassis 226. The end of harness 244 is terminated with a connector 246 which is adapted to connect to and interface with end utility connectors 68 of utility distribution module 24. These different configurations of satellite utility box 220 permit user flexibility in the design and implementation of the particular utility distribution configuration incorporated at a workstation 4.

Figure 36:
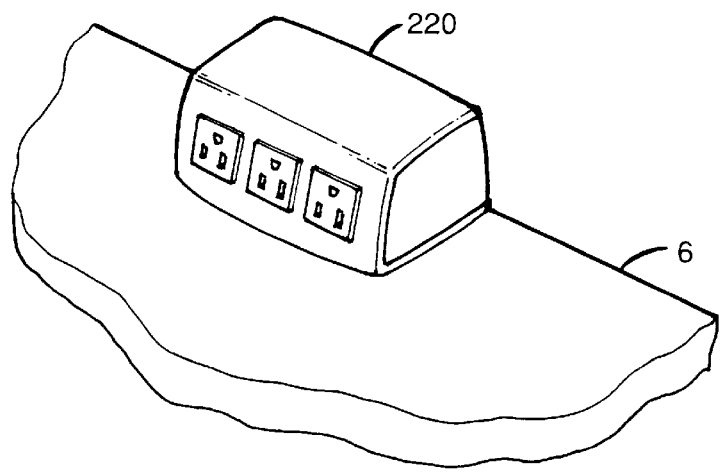
FIG. 36 shows a satellite utility box mounted to an upper rear portion of a worksurface.
Figure 37:
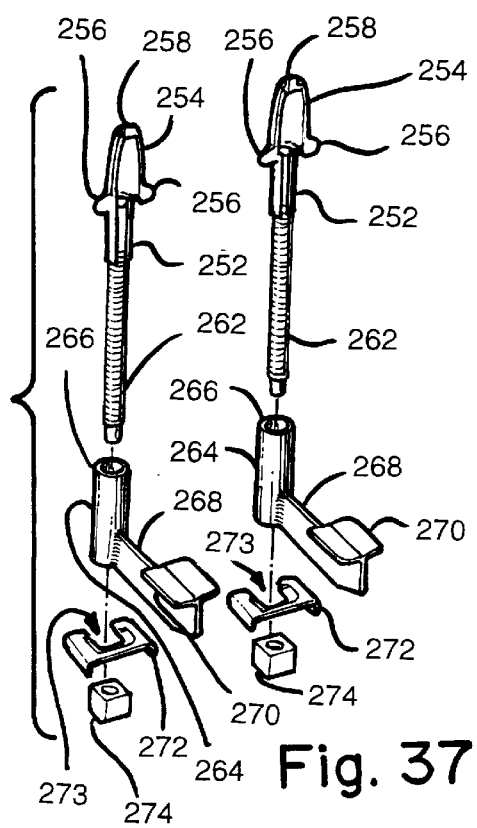
FIG. 37 is an exploded, perspective view of a clamp apparatus for clamping the satellite utility box to the worksurface.
Figure 38:
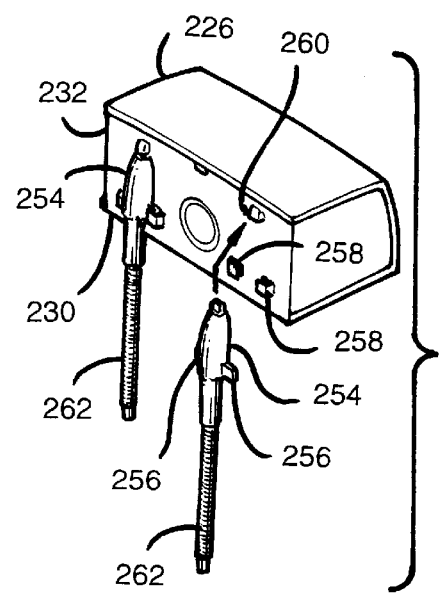
FIG. 38 is a partially exploded, perspective view of a rear portion of a satellite utility box showing the insertion of a threaded rod in the back of the satellite utility box.

As shown in FIG. 36, a satellite utility box such as satellite utility box 220 is shown mounted to an upper surface of worksurface 6 and is clamped thereto utilizing the clamping apparatus 250 shown in FIGS. 37 and 38. In its preferred embodiment, clamping apparatus 250 comprises two threaded rods 252 having at an upper portion thereof an engagement element 254 which, as shown in FIG. 38 has lower wings 256 engaging tabs 258 on a lower portion of chassis back 232 and further includes an upper nose 258 engaging nose receptacle 260 positioned at an upper portion of chassis back 232. Each threaded shaft 262 depends from chassis 226 below chassis bottom 230. Clamping apparatus 250 also includes clamp arms 264, each of which includes cylindrical portion 266 which is sleeved over threaded shaft 262 as shown in FIG. 39. Each clamp arm 264 includes a horizontally extending arm 268 extending at right angles from cylindrical portion 266 and further wherein each arm 268 has a bearing surface 270 at an upper portion thereof for bearing against bottom surface 7 of worksurface 6. Retainers 272 have a slot 273 therein into which is received threaded shaft 262 to retain clamp arms 264 on threaded rods 252. Nuts 274 are threaded onto threaded shaft 262 to bear against retains 272 and to provide the requisite clamping force to maintain satellite utility box 220 in a fixed relationship with respect to worksurface 6.

Turning now to FIG. 40 which illustrates an alternative mounting of satellite distribution box 224 to a bottom surface 7 of worksurface 6 proximate to a front edge thereof, a mount plate 276 having one or more apertures 278 therein receives fasteners 280 for fastening mount plate 276 to lower surface 7. Mount plate 276 also includes flanges 282 formed at either side of mount plate 276 to engage slots 284 of chassis bottom 230 of satellite utility box 224 in a sliding fashion. The mounting of satellite utility box 224 in an inverted orientation to lower surface 7 at a front edge of worksurface 6 provides a convenient access to utility receptacles 234 by the user without dedicating a portion of the upper surface of worksurface 6.

In the foregoing description it will be readily appreciated by those skilled in the art that modifications may be made to the invention without departing from the concept disclosed herein. Such modifications are to be considered as included in the following claims, unless these claims expressly state otherwise.

The invention claimed is:

1. A modular mounting system for the delivery of office utilities from a utility distribution system of an office partitioning system to a worksurface positioned in an individual workspace, said modular utility mounting system comprising:
   a mounting rail including an upper portion thereof shaped for abutting attachment to a bottom surface of the worksurface and further including a lower mounting portion therefor defining at least one mounting aperture therein; and
   a utility distribution bracket abutted to said lower mounting portion, said bracket including a base and an upper frame connected thereto and defining therein a cavity shaped to closely receive a utility distribution block of the modular utility distribution system, said base and said frame further defining at least one aperture for user access to the utility distribution block, said utility distribution bracket further including an engagement member extending through one of said at least one mounting aperture and closely engaging said lower mounting portion of said mounting rail, said utility distribution bracket being disengagable from said mounting rail and interchangeable with others of like utility distribution brackets.

2. A modular mounting system as set forth in claim 1 wherein said lower mounting portion defines a plurality of apertures in a predefined pattern.

3. A modular mounting system as set forth in claim 2 wherein said base and said frame define a plurality of apertures around said utility distribution bracket for user access to the utility distribution block.

4. A modular mounting system as set forth in claim 3 wherein said engagement member comprises at least two mount clips positioned above and parallel to an upper surface of said upper frame, said clips horizontally disposed one from the other in a pattern corresponding to said predefined aperture pattern in said lower mounting portion and each of said clips further defining in combination with said upper surface a horizontal slot, each of said clips extending through ones of said plurality of apertures in said lower mounting portion and engaging a segment of said lower mounting portion in said horizontal slot.

5. A modular mounting system as set forth in claim 4 wherein said upper frame includes a lock engaging said mount rail preventing disengagement of said utility distribution bracket from said mount rail.

6. A modular mounting system as set forth in claim 5 wherein said lock comprises a locking clip at an end of said upper frame, said locking clip includes a horizontal leg having one end affixed to said upper frame and a vertical locking surface extending upwardly at an opposite end thereof and engaging an end of said mount rail and further wherein said vertical locking surface is resiliently downwardly displacable along a substantially vertical plane.

7. A modular mounting system as set forth in claim 5 wherein said base includes an upper base surface and a lower base surface, said upper base surface defining at least one aperture therein adapted to receive a lower mount portion of a utility distribution block of the utility distribution system, and further wherein said lower base surface defines a plurality of apertures in a predefined pattern.

8. A modular mounting system as set forth in claim 7 wherein said predefined aperture pattern of said lower base surface is substantially identical to said predefined aperture pattern of said mount portion of said mount rail.

9. A modular mounting system as set forth in claim 8 wherein said utility distribution bracket comprises a first utility distribution bracket and an identical second utility distribution bracket, said first utility distribution bracket abutted to and engaging said lower mount portion of said mount rail and said second utility distribution bracket abutted to and engaging said lower base surface of said base of said first utility distribution bracket.

10. A modular mounting system as set forth in claim 8 further comprising a data distribution box abutted to said lower base surface wherein said data distribution box is adapted to receive a data distribution block therein.

11. A modular mounting system as set forth in claim 10 wherein said data distribution box further includes at least one mount clip positioned above and parallel to an upper surface of said data distribution box, said at least one mount clip extending through one of said plurality of apertures in said lower base surface of said base and engaging a segment of said lower base surface.

12. A modular mounting system as set forth in claim 11 wherein at least one of said utility distribution brackets and said data distribution box are bi-directionally mounted to a superjacent one of said mounting rail or another of said utility distribution brackets.

13. A modular mounting system as set forth in claim 8 further comprising a wire management bracket attached to said mount rail.

14. A modular mounting system as set forth in claim 13 wherein said wire management bracket comprises a vertical web proximate to said mount rail and a plurality of resilient fingers extending laterally away from a bottom portion of said vertical web and upwardly in a curved fashion wherein ends said fingers are adapted for contact with a bottom of the worksurface, said vertical web and said fingers defining a trough for the placement and management of utility wires associated with the office utility distribution system, adjacent ones of said fingers being spaced one from the other defining slots therebetween for the routing of utility wires therefrom.

15. A modular mounting system as set forth in claim 1 wherein said mounting rail is shaped as an inverted hat section and further wherein said upper portion thereof comprises outer horizontally extending flanges of said inverted hat section.

16. A modular mounting system as set forth in claim 1 wherein said utility distribution bracket engages said lower mounting portion in a fastenerless fashion.

17. A modular mounting system as set forth in claim 1 wherein said utility distribution bracket is attached to said lower mounting portion with fasteners.

18. A modular utility system for the delivery of office utilities from a utility distribution system of an office partitioning system to a worksurface positioned in an individual workspace, said modular utility system comprising:
  a mounting rail including an upper portion thereof shaped for abutting attachment to a bottom surface of the worksurface and further including a lower mounting portion therefor defining at least one mounting aperture therein; and
  a utility distribution module abutted to said lower mounting portion, said module comprising:
    a utility distribution block;
    a base abutted to a bottom of said utility distribution block; and
    an upper frame connected to said base and defining therein a cavity closely receiving said utility distribution block, said base and said frame further defining at least one aperture for user access to said utility distribution block, said upper frame further including an engagement member extending through said mounting aperture and closely engaging a segment of said lower mounting portion of said mounting rail, said utility distribution module being disengagable from said mounting rail and interchangeable with others of like utility distribution modules.

19. A modular utility system as set forth in claim 18 wherein said lower mounting portion defines a plurality of apertures in a predefined pattern.

20. A modular utility system as set forth in claim 19 wherein said base and said frame define a plurality of apertures around said utility distribution module for user access to said utility distribution block.

21. A modular utility system as set forth in claim 20 wherein said engagement member comprises at least two mount clips positioned above and parallel to an upper surface of said upper frame, said clips horizontally disposed one from the other in a pattern corresponding to said predefined aperture pattern in said lower mounting portion and each of said clips further defining in combination with said upper surface a horizontal slot, each of said clips extending through ones of said plurality of apertures in said lower mounting portion and engaging a segment of said lower mounting portion in said horizontal slot.

22. A modular utility system as set forth in claim 21 wherein said upper frame includes a lock engaging said mount rail preventing the disengagement of said utility distribution module from said mount rail.

23. A modular utility system as set forth in claim 22 wherein said lock comprises a locking clip at an end of said upper frame, said locking clip including a horizontal leg having one end affixed to said upper frame and a vertical locking surface extending upwardly at an opposite end thereof and engaging an end of said mount rail and further wherein said vertical locking surface is resiliently downwardly displacable along a substantially vertical plane.

24. A modular utility system as set forth in claim 22 wherein:
  said utility distribution block includes at least one mount finger depending downwardly from a bottom surface of said block; and
  wherein said base includes an upper base surface and a lower base surface, said upper base surface defining at least one aperture therein receiving said mount finger of said utility distribution block, and further wherein said lower base surface defines a plurality of apertures in a predefined pattern.

25. A modular utility system as set forth in claim 24 wherein said predefined aperture pattern of said lower base surface is substantially identical to said predefined aperture pattern of said lower mounting portion of said mounting rail.

26. A modular utility system as set forth in claim 25 wherein:
  said utility distribution module comprises a first utility distribution module and an identical second utility distribution module, said first utility distribution module abutted to and engaging said lower mount portion of said mount rail and said second utility distribution module abutted to and engaging said lower base surface of said base of said first utility distribution module; and
  further comprising a conductive jumper harness including a plurality of utility conductors, a harness connector terminated at each end thereof, one of said harness connectors interconnected to said first utility distribution module and a second of said harness connectors interconnected to said second utility distribution module.

27. A modular utility system as set forth in claim 24 further comprising a data distribution box abutted to said lower base surface wherein said data distribution box is adapted to receive a data distribution block therein.

28. A modular utility system as set forth in claim 27 wherein said data distribution box further includes at least one mount clip positioned above and parallel to an upper surface of said data distribution box, said at least one mount clip extending through one of said plurality of apertures in said lower base surface of said base and engaging a segment of said lower base surface.

29. A modular utility system as set forth in claim 28 wherein at least one of said utility distribution modules and said data distribution box are bi-directionally mountable to a superjacent one of said mounting rail or another of said utility distribution modules.

30. A modular utility system as set forth in claim 25 further comprising a wire management bracket attached to said mount rail.

31. A modular utility system as set forth in claim 30 wherein said wire management bracket comprises a vertical web proximate to said mount rail and a plurality of resilient fingers extending laterally away from a bottom portion of said vertical web and upwardly in a curved fashion wherein ends said fingers are adapted for contact with a bottom of the worksurface, said vertical web and said fingers defining a trough for the placement and management of utility wires associated with the office utility distribution system, adjacent ones of said fingers being spaced one from the other defining slots therebetween for the routing of utility wires therefrom.

32. A modular utility system as set forth in claim 18 wherein said utility distribution module engages said lower mounting portion in a fastenerless fashion.

33. A modular utility system as set forth in claim 18 wherein said utility distribution module is attached to said lower mounting portion with fasteners.

34. A modular utility system as set forth in claim 18 wherein:
   said base and said frame define a plurality of apertures therearound for user access to said utility distribution block;
   each of said apertures positionally corresponds to at least one utility connector of said utility distribution block; and
   wherein said modular utility system further comprises:
      a conductive harness including a plurality of utility conductors, a harness connector terminated at one end thereof and connected to one of said utility connectors of said utility distribution block, and adapted at a second end thereof for interconnection with the modular utility distribution system.

35. A modular utility system as set forth in claim 18 wherein:
   said mounting rail comprises a first mounting rail and an identical second mounting rail in an end-to-end abutting relationship;
   said utility distribution module comprises a first utility distribution module and an identical second utility distribution module, said first distribution module abutted to and engaging said lower mounting portion of said first mounting rail and said second distribution module abutted to and engaging said lower mounting portion of said second mounting rail; and
   an in-line utility connector interconnecting said first utility distribution module with said second utility distribution module.

36. A modular utility system as set forth in claim 35 further comprising:
   a third utility distribution module abutted to and engaging said lower base surface of said base of said first utility distribution module; and
   a conductive jumper harness including a plurality of utility conductors, a harness connector terminated at each end of each of said utility conductors, one of said harness connectors interconnected to said first utility distribution module and a second of said harness connectors interconnected to said third utility distribution module.

37. A modular utility system as set forth in claim 18 further comprising a satellite utility box, said satellite utility box including:
   a chassis having a front, a back, and a bottom adapted for abutting contact with a worksurface;
   at least one utility receptacle mounted in said front and adapted for interfacing with and delivering utilities to an office appliance; and
   a utility harness having a plurality of utility conductors therein, a first end of said harness terminated within said chassis and in utility communication with said receptacle and a second end terminated with a utility connector, said utility connector interconnected with said utility distribution module.

38. A modular utility system as set forth in claim 37 wherein said satellite utility box further comprises a clamp apparatus affixed to said back for clamping said box to an edge of the worksurface.

39. A modular utility system as set forth in claim 37 wherein said satellite utility box further comprises a mount plate adapted for abutting a surface of the worksurface, said plate including a flange on each side thereof, and further wherein each of said flanges engages a slot in said bottom of said chassis.

40. A modular utility system as set forth in claim 18 wherein said mounting rail is shaped as an inverted hat section and further wherein said upper portion thereof comprises outer horizontally extending flanges of said inverted hat section.

41. A utility distribution kit particularly adapted for attachment to a worksurface positioned in an individual workspace to deliver office utilities from a utility distribution system of an office partitioning system, comprising:
   at least one mounting rail including an upper portion thereof shaped for abutting attachment to a bottom surface of the worksurface and further including a lower mounting portion therefor defining a plurality of mounting apertures therein arranged in a predefined pattern;
   at least one utility distribution module including a utility distribution block having a plurality of utility block connectors, a base including a plurality of apertures in a lower base surface and abutted to a bottom of said utility distribution block and an upper frame connected to said base and defining therein a cavity closely receiving said utility distribution block, said base and said frame further defining at least a plurality of apertures therearound for user access to said utility distribution block, said upper frame further including an engagement member such that said engagement member can be extended through one of said mounting apertures and to closely engage a segment of said lower mounting portion of said mounting rail; and
   a conductive harness including a plurality of utility conductors, a harness connector terminated at one end thereof for connection to one of said utility block connectors of said utility distribution block, and adapted at a second end thereof for interconnection with the utility distribution system.

42. A utility distribution kit as set forth in claim 41, further comprising:
   a jumper harness including a plurality of utility conductors, a harness connector terminated at each end thereof for connection to one of said utility block connectors.

43. A utility distribution kit as set forth in claim 42, further comprising:
   a data distribution box adapted to receive a data distribution block therein including at least one mount clip positioned above and parallel to an upper surface of said data distribution box such that said mount clip can extend through one of said plurality of apertures in said lower base surface of said base and engage a segment of said lower base surface.

44. A utility distribution kit as set forth in claim 42, further comprising:

a wire management bracket comprising a vertical web and a plurality of resilient fingers extending laterally away from a bottom portion of said vertical web and upwardly in a curved fashion wherein ends of said fingers are adapted for contact with a bottom of the worksurface, said vertical web and said fingers defining a trough for the placement and management of utility wires associated with the office utility distribution system, adjacent ones of said fingers being spaced one from the other defining slots therebetween for the routing of utility wires therefrom.

45. A utility distribution kit as set forth in claim 44, further comprising:

an in-line connector for interconnecting two utility distribution modules of said at least one utility distribution module in an end-to-end fashion.

46. A utility distribution kit as set forth in claim 45, further comprising:

a satellite utility box, said satellite utility box including:

a chassis having a front, a back, and a bottom adapted for abutting contact with a worksurface;

at least one utility receptacle mounted in said front and adapted for delivering utilities to an office appliance; and a utility harness having a plurality of utility conductors therein, a first end of said harness terminated within said chassis and in utility communication with said receptacle and a second end terminated with a utility connector for interconnection with said at least one utility distribution module.

* * * * *

UNITED STATES PATENT AND TRADEMARK OFFICE
CERTIFICATE OF CORRECTION

PATENT NO. : 5,886,295
DATED : March 23, 1999
INVENTOR(S) : Phillip D. Carino et al It is certified that error appears in the above-identified patent and that said Letters Patent is hereby corrected as shown below:

Column 2, line 5;
  "an" should be - -and- -.

Column 3, line 24;
  "mount" should be - -mounting- -.

Column 4, line 6;
  "tabs" should be - -tab- -.

Column 8, line 27;
  "extends" should be - -extend- -.

Column 8, line 34;
  Delete "and" before "comprises".

Column 11, line 23;
  "retains" should be - - retainers- -.

UNITED STATES PATENT AND TRADEMARK OFFICE
CERTIFICATE OF CORRECTION

PATENT NO.    : 5,886,295
DATED         : March 23, 1999
INVENTOR(S) : Phillip D. Carino et al It is certified that error appears in the above-identified patent and that said Letters Patent is hereby corrected as shown below:

Column 13, claim 14, line 9;
    After "ends" insert - -of- -.

Column 15, claim 31, line 3;
    After "ends" insert - -of- -.

Signed and Sealed this

Eighth Day of May, 2001

*Attest:*

NICHOLAS P. GODICI

*Attesting Officer*          Acting Director of the United States Patent and Trademark Office